(12) United States Patent
Zhang et al.

(10) Patent No.: US 11,438,091 B2
(45) Date of Patent: Sep. 6, 2022

(54) METHOD AND APPARATUS FOR PROCESSING BIT BLOCK STREAM, METHOD AND APPARATUS FOR RATE MATCHING OF BIT BLOCK STREAM, AND METHOD AND APPARATUS FOR SWITCHING BIT BLOCK STREAM

(71) Applicant: HUAWEI TECHNOLOGIES CO., LTD., Guangdong (CN)

(72) Inventors: Xiaojun Zhang, Shenzhen (CN); Shuai Xiao, Shenzhen (CN); Min Zha, Shenzhen (CN); Lehong Niu, Shenzhen (CN); Xingyao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 16/775,338

(22) Filed: Jan. 29, 2020

(65) Prior Publication Data

US 2020/0169350 A1    May 28, 2020

Related U.S. Application Data

(63) Continuation of application No. PCT/CN2017/095085, filed on Jul. 29, 2017.

(51) Int. Cl.
*H04W 4/00* (2018.01)
*H04L 1/00* (2006.01)

(52) U.S. Cl.
CPC ............ *H04L 1/0013* (2013.01); *H04L 1/003* (2013.01); *H04L 1/0003* (2013.01); *H04L 1/0018* (2013.01)

(58) Field of Classification Search
CPC ...... H04W 28/06; H04L 1/0007; H04L 69/22; H04L 1/0003; H04L 47/365;
(Continued)

(56) References Cited

U.S. PATENT DOCUMENTS 4,470,140 A * 9/1984 Coffey ................. H04M 9/025
                                                    370/458
4,625,308 A * 11/1986 Kim ..................... H04B 7/2123
                                                    370/321

(Continued)

FOREIGN PATENT DOCUMENTS

CN     106341207 A    1/2017
CN     106612203 A    5/2017
(Continued)

OTHER PUBLICATIONS

Optical Internetworking Forum, "Flex Ethernet Implementation Agreement", IA # OIF-FLEXE-01.0, Mar. 2016, 31 pages.
(Continued)

*Primary Examiner* — Atique Ahmed
(74) *Attorney, Agent, or Firm* — Fish & Richardson P.C.

(57) ABSTRACT

Example methods and apparatus for processing a bit block stream are described. One example method includes obtaining a first to-be-processed bit block stream and mapping the first to-be-processed bit block stream into at least two slot bit block streams. The at least two slot bit block streams include a first slot bit block stream and a second slot bit block stream. The first slot bit block stream includes a first boundary bit block and a second boundary bit block. The second slot bit block stream includes a third boundary bit block and a fourth boundary bit block. N first bit blocks exist between the first boundary bit block and the second boundary bit block. N first bit blocks exist between the third boundary bit block and the fourth boundary bit block. The first bit block is a non-idle bit block.

13 Claims, 21 Drawing Sheets

(58) Field of Classification Search
CPC ..... H04L 1/0013; H04L 1/003; H04L 1/0018; H04L 49/352; H04L 1/0061; H04L 12/28; H04L 25/49; H04L 1/0067; H04L 49/351; H04J 2203/0085; H04J 3/1658; H04J 3/1617

See application file for complete search history.

(56) References Cited

U.S. PATENT DOCUMENTS

| | | | |
|---|---|---|---|
| 2002/0126689 A1* | 9/2002 | Redington | H04J 3/1682 370/537 |
| 2002/0193106 A1* | 12/2002 | Koo | H04W 72/1236 455/423 |
| 2006/0002363 A1* | 1/2006 | Pirhonen | H04L 1/0069 370/345 |
| 2006/0222129 A1* | 10/2006 | Hadzic | H04L 7/0338 375/360 |
| 2007/0083491 A1* | 4/2007 | Walmsley | G06F 21/608 |
| 2007/0234172 A1* | 10/2007 | Chiabrera | H04L 1/0045 714/752 |
| 2008/0138075 A1 | 6/2008 | Gustlin et al. | |
| 2013/0291046 A1* | 10/2013 | Ko | H04H 60/11 725/116 |
| 2015/0110016 A1* | 4/2015 | Kim | H04L 5/001 370/329 |
| 2016/0087647 A1* | 3/2016 | Fenney | H03M 7/4031 341/67 |
| 2017/0005742 A1 | 1/2017 | Gareau et al. | |
| 2017/0005901 A1 | 1/2017 | Gareau | |
| 2018/0049192 A1* | 2/2018 | Beale | H04W 72/0453 |
| 2018/0098076 A1 | 4/2018 | Su et al. | |

FOREIGN PATENT DOCUMENTS

| | | |
|---|---|---|
| CN | 106850465 A | 6/2017 |
| CN | 106982105 A | 7/2017 |
| EP | 3113502 A1 | 1/2017 |
| EP | 3637650 A1 | 4/2020 |
| JP | 2011199361 A | 10/2011 |
| WO | 2016182802 A1 | 11/2016 |
| WO | 2016197894 A1 | 12/2016 |

OTHER PUBLICATIONS

PCT International Search Report and Written Opinion in International Application No. PCT/CN2017/095,085, dated Apr. 27, 2018, 15 pages (With English Translation).

Office Action issued in Japanese Application No. 2020-504313 dated Apr. 20, 2021, 15 pages (with English translation).

AMCC, "Information Transparent Transport of 10 GbE LAN Signals over OTN," International Telecommunication Union; COM 15-D 79-E 7; Study Period 2005-2008, Geneva, XP017407196, Nov. 29, 2004, 15 pages.

Extended European Search Report issued in European Application No. 17919699.3 dated Jun. 2, 2020, 10 pages.

* cited by examiner

FIG. 1A

| 10 | 0x1E | // (0x00) | // (0x00) | // (0x00) | // (0x00) | // (0x00) | // (0x00) | // (0x00) |

FIG. 1B

METHOD AND APPARATUS FOR PROCESSING BIT BLOCK STREAM, METHOD AND APPARATUS FOR RATE MATCHING OF BIT BLOCK STREAM, AND METHOD AND APPARATUS FOR SWITCHING BIT BLOCK STREAM

CROSS-REFERENCE TO RELATED APPLICATIONS

This application is a continuation of international Application No. PCT/CN2017/095085, filed on Jul. 29, 2017, which is hereby incorporated by reference in its entirety.

TECHNICAL FIELD

This application relates to the field of communications technologies, and in particular, to a method and an apparatus for processing a bit block stream, a method and an apparatus for rate matching of a bit block stream, and a method and an apparatus for switching a bit block stream.

BACKGROUND

As a service interface, 802.3-based Ethernet defined by the Institute of Electrical and Electronics Engineers (Institute of Electrical and Electronics Engineers, IEEE) is applied in various scenarios and becomes a huge success. However, as technologies further develop, a difference between bandwidth granularities becomes larger, and an excessive deviation from an actual application requirement expectation is more easily caused. Bandwidth required by a mainstream application may not belong to any Ethernet standard rate. For example, resources are wasted if 100 GE is used to transmit 50 Gbps, and currently, no corresponding Ethernet standard granularity can carry 200 Gbps. It is expected that flexible-bandwidth ports (virtual connections) can share one or several Ethernet physical interfaces. For example, two 40 GE ports and two 10 GE ports share one 100 G physical interface. A concept of flexible Ethernet (FlexE) rises to the occasion. Specifically, a flexible-bandwidth port application requirement is met by using functions such as bonding several Ethernet physical layer (PHY) apparatuses into a FlexE group, and physical layer channelization (sub-rating). Therefore, a Media Access Control (MAC) rate provided by FlexE may be greater than a rate of a single PHY (by bonding), or may be less than a rate of a single PHY (by channelization).

FlexE constructs a fixed frame format for transmission on a physical interface, and performs time-division multiplexing (TDM) slot division. The TDM slot division in FlexE is based on a 66 B bit block, which is also referred to as a bit block. Slot interleaving is implemented by 66-bit block interleaving. The FlexE standard divides a 100 G physical interface into 20 slots, with 5 G bandwidth per slot. A slot interleaving period includes 20 bit blocks, slot alignment is implemented by using an overhead bit block, and an alignment overhead is inserted every 1023 slot cycle periods (that is, 1023×20 bit blocks). If bandwidth of a FlexE client signal is 5 G, the signal occupies exactly one slot; or if bandwidth of a FlexE client signal is (5*n)G, the signal occupies n slots.

A service of a FlexE client signal is mapped to one or more slots of a physical interface for transmission, and rate adaptation or switching cannot be performed separately on bit block streams that are transmitted in a plurality of slots.

SUMMARY

Embodiments of this application provide a method and an apparatus for processing a bit block stream, a method and an apparatus for rate matching of a bit block stream, and a method and an apparatus for switching a bit block stream, to resolve a problem that rate adaptation or switching cannot be performed separately on bit block streams in a single slot.

According to a first aspect, a method for processing a bit block stream is provided, including: obtaining, by a transmit-end device, a first to-be-processed bit block stream; and mapping, by the transmit-end device, the first to-be-processed bit block stream into at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, the first bit block is a non-idle bit block, and N is an integer greater than or equal to 1.

A quantity of non-idle bit blocks between the first boundary bit block and the second boundary bit block is equal to a quantity of non-idle bit blocks between the third boundary bit block and the fourth boundary bit block. Therefore, in a transmission process, slot rate matching and slot switching can be performed separately on a single slot bit block stream, or different slot bit block streams may be transmitted to a receive-end device by using different transmission paths or different intermediate nodes. The receive-end device may align the slot bit block streams by using the boundary bit blocks after all idle bit blocks are deleted, thereby restoring a to-be-received bit block stream.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the method further includes: sending the first slot bit block stream by using a first slot of a first physical interface, and sending the second slot bit block stream by using a second slot of the first physical interface; or sending the first slot bit block stream by using a first slot of a first physical interface, and sending the second slot bit block stream by using a second slot of a second physical interface.

In a possible design, the obtaining a first to-be-processed bit block stream specifically includes: obtaining a first to-be-processed service; and performing bit block encoding on the first to-be-processed service, to obtain the first to-be-processed bit block stream.

In a possible design, the sending the first slot bit block stream by using a first slot of a first physical interface specifically includes: adding or deleting an idle bit block between the first boundary bit block and the second boundary bit block, to obtain a first slot bit block stream whose rate is adapted; and sending, by using the first slot of the first physical interface, the first slot bit block stream whose rate is adapted.

In a possible design, the sending the second slot bit block stream by using a second slot of the first physical interface, or sending the second slot bit block stream by using a second slot of a second physical interface specifically includes: adding or deleting an idle bit block between the third boundary bit block and the fourth boundary bit block, to obtain a second slot bit block stream whose rate is adapted; and sending, by using the second slot of the first physical interface, the second slot bit block stream whose rate is adapted, or sending, by using the second slot of the second physical interface, the second slot bit block stream whose rate is adapted.

In a possible design, the method further includes: switching the first slot bit block stream in the first slot of the first physical interface to a third slot of a third physical interface.

In a possible design, the mapping the first to-be-processed bit block stream into at least two slot bit block streams specifically includes: mapping the first to-be-processed bit block stream into the at least two slot bit block streams in a round-robin scheduling manner.

According to a second aspect, a method for rate adaptation of a bit block stream is provided, including: obtaining a first slot bit block stream, where the first slot bit block stream includes a first boundary bit block and a second boundary bit block, N first bit blocks exist between the first boundary bit block and the second boundary bit block, the first bit block is a non-idle bit block, and N is an integer greater than or equal to 1; adding or deleting an idle bit block between the first boundary bit block and the second boundary bit block, to obtain a first slot bit block stream whose rate is adapted; and sending, by using a second slot of a second physical interface, the first slot bit block stream whose rate is adapted.

A single slot bit block stream includes boundary bit blocks, and a non-idle bit block exists between the boundary bit blocks, so that an idle bit block may be added or deleted between the boundary bit blocks. A receive-end device may align the slot bit block streams by using the boundary bit blocks after all idle bit blocks are deleted, thereby restoring a to-be-received bit block stream.

In a possible design, a type of each bit block is an M1/M2 bit block, where M1 represents a quantity of payload bits of each bit block, M2 represents a total quantity of bits of each bit block, M1 and M2 are positive integers, and M2>M1.

According to a third aspect, a method for switching a bit block stream is provided, including: obtaining a first slot bit block stream by using a first slot of a first physical interface, where the first slot bit block stream includes a first boundary bit block and a second boundary bit block, N first bit blocks exist between the first boundary bit block and the second boundary bit block, the first bit block is a non-idle bit block, and N is an integer greater than or equal to 1; switching the first slot bit block stream to a second slot of a second physical interface; and sending the first slot bit block stream by using the second slot of the second physical interface.

A single slot bit block stream includes boundary bit blocks, and a non-idle bit block exists between the boundary bit blocks, so that separate slot switching can be performed on a single slot bit block stream. A receive-end device may align the slot bit block streams by using the boundary bit blocks after all idle bit blocks are deleted, thereby restoring a to-be-received bit block stream.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the sending the first slot bit block stream by using the second slot of the second physical interface specifically includes: adding or deleting an idle bit block between the first boundary bit block and the second boundary bit block, to obtain a first slot bit block stream whose rate is adapted; and sending, by using the second slot of the second physical interface, the first slot bit block stream whose rate is adapted.

In a possible design, the switching the first slot bit block stream to a second slot of a second physical interface specifically includes: switching the first slot bit block stream to the second slot of the second physical interface based on a correspondence between the first slot of the first physical interface and the second slot of the second physical interface.

According to a fourth aspect, a method for processing a bit block stream is provided, including: obtaining, by a receive-end device, at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, and the first bit block is a non-idle bit block; deleting, by the receive-end device, an idle bit block between the first boundary bit block and the second boundary bit block, and deleting an idle bit block between the third boundary bit block and the fourth boundary bit block; aligning, based on the first boundary bit block and the third boundary bit block as well as the second boundary bit block and the fourth boundary bit block, the first slot bit block stream whose idle bit block is deleted with the second slot bit block stream whose idle bit block is deleted; and demapping, into a first to-be-received bit block stream, the first slot bit block stream and the second slot bit block stream that are aligned.

A quantity of non-idle bit blocks between the first boundary bit block and the second boundary bit block that are received by the receive-end device is equal to a quantity of non-idle bit blocks between the third boundary bit block and the fourth boundary bit block that are received by the receive-end device. The receive-end device may align the slot bit block streams by using the boundary bit blocks after all idle bit blocks are deleted, thereby restoring a to-be-received bit block stream.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the method further includes: performing bit block decoding on the first to-be-received bit block stream, to obtain a first to-be-received service.

In a possible design, the method further includes: performing IPG restoration on the first to-be-received bit block stream, to obtain a first to-be-received service.

In a possible design, the obtaining at least two slot bit block streams specifically includes: obtaining the first slot bit block stream by using a first slot of a first physical interface, and obtaining the second slot bit block stream by using a second slot of the first physical interface; or obtaining the first slot bit block stream by using a first slot of a first physical interface, and obtaining the second slot bit block stream by using a second slot of a second physical interface.

According to a fifth aspect, an apparatus for processing a bit block stream is provided, including a receiver and a processor, where the apparatus for processing a bit block stream is configured to implement the method according to any one of the first aspect or the possible implementations of the first aspect.

According to a sixth aspect, an apparatus for rate adaptation of a bit block stream is provided, including a receiver, a rate adapter, and a transmitter, where the apparatus for rate adaptation of a bit block stream is configured to implement the method according to any one of the second aspect or the possible implementations of the second aspect.

According to a seventh aspect, an apparatus for switching a bit block stream is provided, including a receiver, a switch, and a transmitter, where the apparatus for switching a bit block stream is configured to implement the method according to any one of the third aspect or the possible implementations of the third aspect.

According to an eighth aspect, an apparatus for processing a bit block stream is provided, including a receiver and a processor, where the apparatus for processing a bit block stream is configured to implement the method according to any one of the fourth aspect or the possible implementations of the fourth aspect.

BRIEF DESCRIPTION OF DRAWINGS

FIG. 1A is a schematic diagram of a code type definition of 64/66 encoding according to an embodiment of this application;

FIG. 1B is a schematic diagram of a code type definition of an idle block according to an embodiment of this application;

DESCRIPTION OF EMBODIMENTS

Figure 2A:
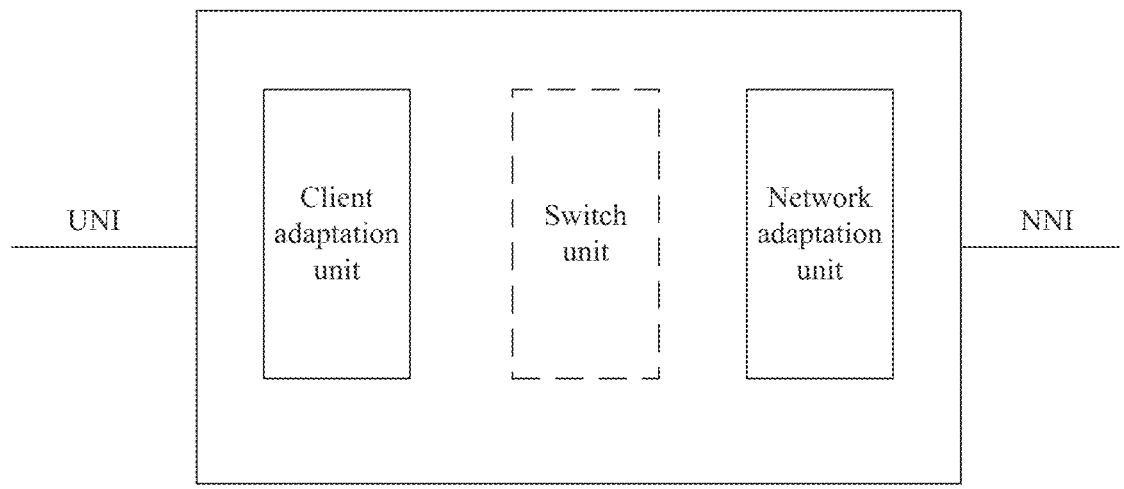
FIG. 2A is a schematic structural diagram of a PE device according to an embodiment of this application.

In Ethernet, an Ethernet port usually appears as a data-oriented logical concept, and is referred to as a logical port or a port for short; and an Ethernet physical interface appears as a hardware concept, and is referred to as a physical interface or an interface for short. Usually, a MAC address is used to identify an Ethernet port. Conventionally, a rate of an Ethernet port is determined based on a rate of an Ethernet physical interface. Generally, maximum bandwidth of an Ethernet port corresponds to bandwidth of an Ethernet physical interface, for example, a 10 Mbps, 100 Mbps, 1000 Mbps (1 Gbps), 10 Gbps, 40 Gbps, 100 Gbps, and 400 Gbps Ethernet physical interface.

Ethernet has been widely applied and has greatly developed during a very long time in the past. A rate of an Ethernet port increases in powers of 10 and continuously develops from 10 Mbps to 100 Mbps, 1000 Mbps (1 Gbps), 10 Gbps, 40 Gbps, 100 Gbps, and 400 Gbps. As technologies further develop, a difference between bandwidth granularities becomes larger, and a deviation from an actual application requirement expectation is more easily caused. Bandwidth required by a mainstream application does not increase in powers of 10. For example, the bandwidth required by the mainstream application increases from 50 Gbps to 75 Gbps, 200 Gbps, and the like. It is expected in the industry that an Ethernet port (virtual connection) of bandwidth such as 50 Gbps, 60 Gbps, 75 Gbps, 200 Gbps, and 150 Gbps can be supported.

Further, it is expected that some flexible-bandwidth ports can be provided, and these ports can share one or several Ethernet physical interfaces. For example, two 40 GE ports and two 10 GE ports share one 1000 physical interface. In addition, a rate can be flexibly adjusted as a requirement changes, for example, adjusted from 200 Gbps to 330 Gbps, or from 50 Gbps to 20 Gbps, to improve port use efficiency or extend a port life cycle. Fixed-rate physical links may be bonded in a cascaded manner, to support a stacked increase of a rate of a logical port (for example, two 100 GE physical interfaces are bonded in a stacked and cascaded manner to support a 200 GE logical port). Furthermore, bandwidth resources obtained by flexible stacking of physical interfaces can be pooled, and bandwidth of the physical interfaces is allocated to a specific Ethernet logical port at a granularity (for example, at a 5 G granularity), so that several Ethernet virtual connections efficiently share a group of physical links cascaded in a stacked manner.

Therefore, a concept of FlexE rises to the occasion. Flexible Ethernet is also referred to as flexible virtual Ethernet. FlexE supports functions such as sub-rating, channelization, and inverse multiplexing of an Ethernet service. For example, in a sub-rating application scenario of an Ethernet service. FlexE can support transferring a 250 G Ethernet service MAC code stream) through three existing 100 GE physical interfaces. In an inverse multiplexing scenario of an Ethernet service, FlexE can support transferring a 200 G Ethernet service through two existing 100 GE Physical Medium Dependent (PMD) sublayers. In a channelization scenario of an Ethernet service, FlexE can support several logical ports in sharing one or more physical interfaces, and can support multiplexing a plurality of low-rate Ethernet services into high-rate flexible Ethernet.

Because Ethernet is widely used as a service interface in an access network and a metropolitan area network, such a FlexE technology based on a service traffic aggregation function of an Ethernet technology can implement a seamless connection to an Ethernet interface of an underlying service network. Introduction of these functions such as sub-rating, channelization, and inverse multiplexing of FlexE greatly expands application scenarios of Ethernet, improves application flexibility of Ethernet, and makes the Ethernet technology gradually penetrate into a field of a transport network.

FlexE provides a feasible evolution direction for virtualization of an Ethernet physical link. Flexible Ethernet needs to support several virtual Ethernet data connections on a group of cascaded physical interfaces. For example, four 100 GE physical interfaces are bonded in a cascaded manner, to support several logical ports. If bandwidth of some of the several logical ports decreases, bandwidth of the other logical ports increases, and a total amount of decreased bandwidth is equal to a total amount of increased bandwidth. Bandwidth of the several logical ports is rapidly and flexibly adjusted, and the several logical ports share the four 100 GE physical interfaces.

With reference to a synchronous digital hierarchy (SDH)/optical transport network (OTN) technology, FlexE constructs a fixed frame format for transmission on a physical interface, and performs TDM slot division. A difference from SDH/OTN is that a granularity of TDM slot division in FlexE is 66 bits and can carry exactly one 64b/66b block correspondingly. A FlexE frame includes eight rows. A location of the first 66-bit block in each row is a FlexE overhead area, and a payload area of slot division follows the overhead area and corresponds to 20×1023 66-bit carrier spaces at a granularity of 66 bits. Bandwidth of a 100 GE interface is divided into 20 slots, and bandwidth of each slot is approximately 5 Gbps. FlexE implements a plurality of transmission channels on a single physical interface in an interleaved multiplexing manner. In other words, a plurality of slots are implemented.

Several physical interfaces may be bonded in a cascaded manner, and all slots of the several physical interfaces may carry an Ethernet logical port in combination. For example, 10 GE requires two slots, and 25 GE requires five slots. Sequentially transmitted 66-bit blocks are still visible to the logical port, each logical port corresponds to one MAC and transmits a corresponding Ethernet packet, and a start and an end of the packet and identification of idle padding are the same as those in conventional Ethernet.

FlexE is merely an interface technology, and a related switching technology is still performed based on an Ethernet packet. However, with extensive researches into the 5th generation (5 G) communications technologies and the Internet of Things, deterministic low-latency, reliability, and security isolation technologies have become an important task that urgently needs to be addressed. The inventors define a switching technology based on a physical interface hard pipe. X-Ethernet (X-E for short) is a switching technology based on an Ethernet physical layer bit block, for example, a 64b/66b block, and has a technical feature of deterministic ultralow-latency.

A bit block mentioned in embodiments of this application may be an M1/M2 bit block, or may be referred to as an M1b/M2b bit block. M1/M2 represents an encoding mode, where M1 represents a quantity of payload bits of each bit block, M2 represents a total quantity of bits of each bit block, M1 and M2 are positive integers, and M2/M1.

Such an M1/M2 bit block stream is transferred on Ethernet physical layer link. For example, 1 G Ethernet uses 8b/10b encoding, and an 8b/10b block stream is transferred on a 1 GE physical layer link; 10/40/100 GE uses 64b/66b encoding, and a 64b/66b block stream is transferred on a 10/40/100 GE physical layer link. In the future, other encoding modes may further occur with the development of the Ethernet technology. For example, 128b/130b encoding, 256b/258b encoding, and the like may occur. For ease of description, an M1/M2 bit block stream is used for representation in the embodiments of this application.

Figure 1A:
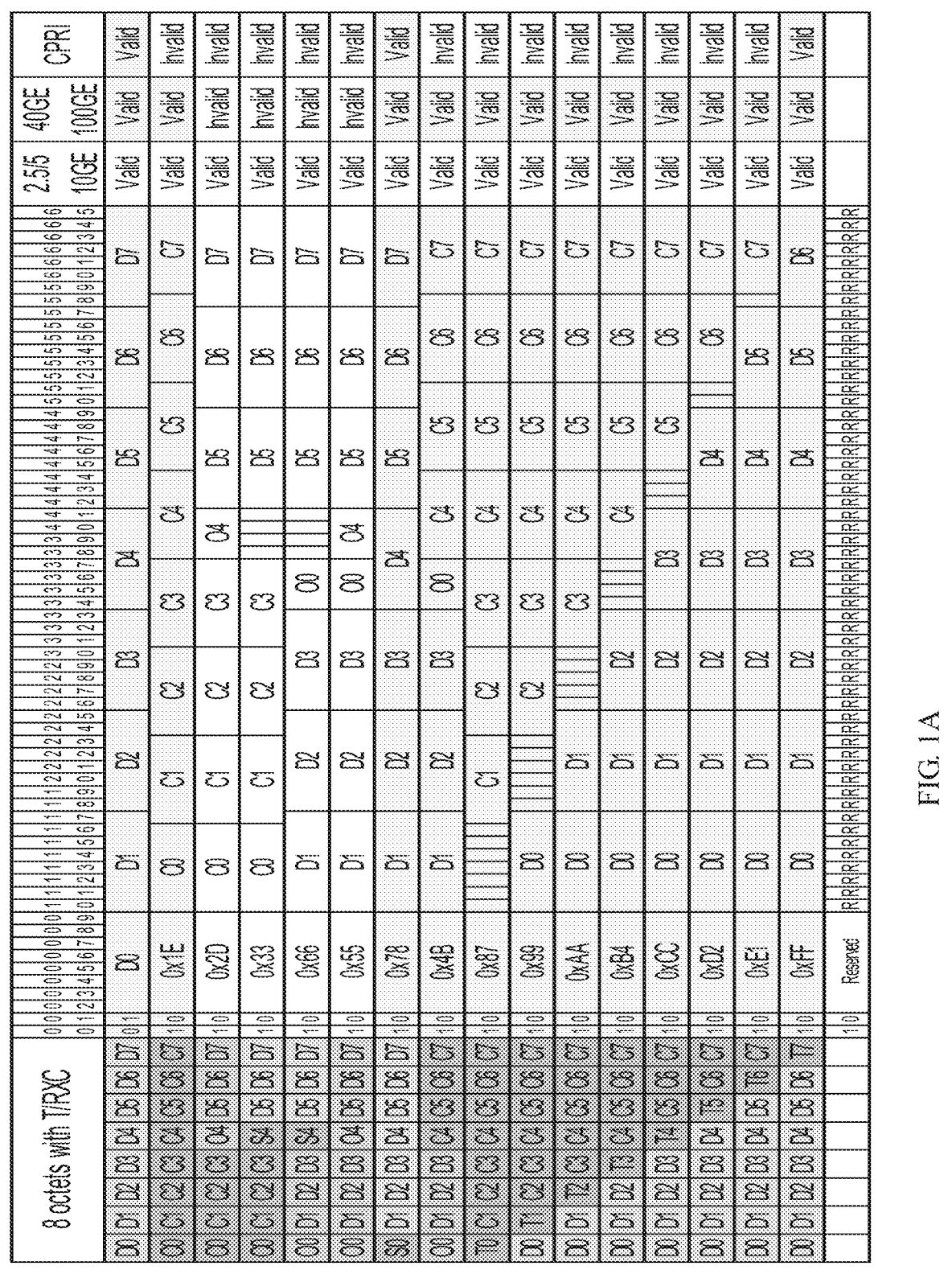
Figure 1B:
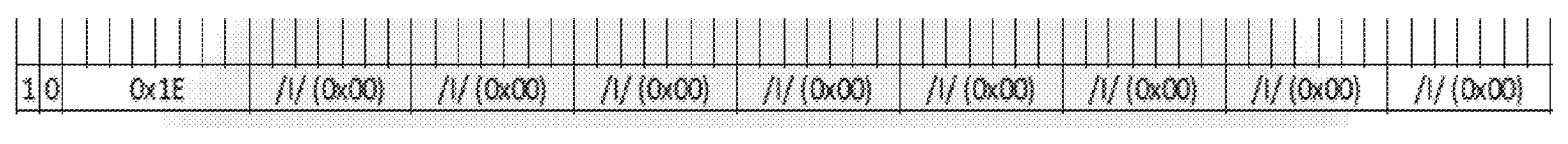

For the M1/M2 bit block stream, different types of bit blocks exist and are explicitly specified in a standard. Code type definitions of 64b/66b encoding are used as an example below for description. As shown in FIG. 1A, the first two bits "10" or "01" are synchronization header bits of a 64b/66b block, and subsequent 64 bits are used to carry payload data or a protocol. In FIG. 1A, there are 16 code type definitions. Each row represents a code type definition of one type of bit block: D0 to D7 represent data bytes, C0 to C7 represent control bytes, S0 represents a start byte, and T0 to T7 represent end bytes. The second row corresponds to a code type definition of an idle bit block (idle block), and the idle bit block may be represented by /I/, and is specifically shown in FIG. 1B. The seventh row corresponds to a code type definition of a start block, and the start block may be represented by /S/. The ninth to sixteenth rows correspond to code type definitions of eight end blocks, respectively, and all the eight end blocks may be represented by /T/.

An interface mentioned in the embodiments of this application may be the Ethernet physical interface mentioned above, or may be another physical interface, for example, may be an optical transport network (Optical Transport Network, OTN) interface, a flexible optical transport network (Flexible OTN, FlexOTN) interface, a flexible Ethernet FlexE interface, a common public radio interface (Common Public Radio Interface, CPRI), a Synchronous Digital Hierarchy (Synchronous Digital Hierarchy, SDH) interface, a Fibre Channel (Fibre Channel, FC) interface, or an InfiniBand interface, for another example, may be a physical interface C2C interface inside a device.

A port mentioned in the embodiments of this application may be the Ethernet port mentioned above, or may certainly be another logical service port, for example, may be an optical transport network OTN logical service port, a flexible optical transport network FlexOTN logical service port, a flexible Ethernet FlexE logical service port, a common public radio logical service port CPRI, a Synchronous Digital Hierarchy SDH logical service port, a Fibre Channel FC logical service port, or an InfiniBand logical service port.

When a service of a FlexE client is mapped to a plurality of slots of one or more physical interfaces for transmission, rate adaptation or switching cannot be performed separately on bit block streams transmitted in the slots. The embodiments of the present invention mainly provide four logical functions: transmit-end mapping, slot rate adaptation, slot switching, and receive-end demapping. By mapping at a transmit end, separate slot rate adaptation and separate slot switching can be performed in a slot of a physical interface, and a service can be restored at a receive end. If a service occupies a plurality of slots, and rate adaptation and switching are performed separately in each slot, transmission delays in different slots may be different, and insertion or deletion locations of idle bit blocks in different slots may be different. Based on the four logical functions provided in the embodiments of the present invention, slot rate adaptation or slot switching can be performed separately in each slot, and a delay difference and a location difference can be eliminated at the receive end, to correctly restore a to-be-received bit block stream.

Figure 2B:
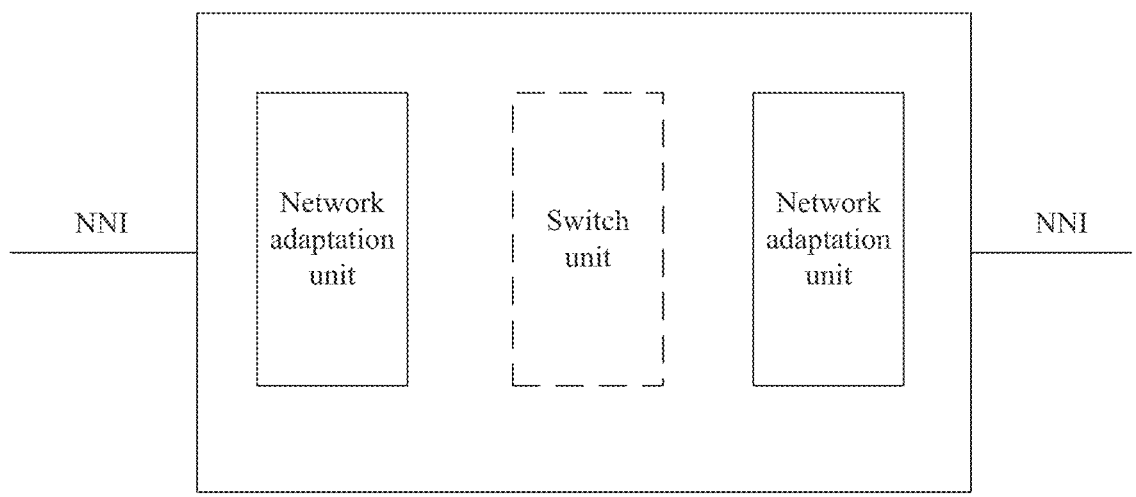
FIG. 2B is a schematic structural diagram of a P device according to an embodiment of this application.

In the embodiments of the present invention, a bit block stream may be transferred by using devices shown in FIG. 2A and FIG. 2B. Specifically, FIG. 2A and FIG. 2B show a provider edge (Provider Edge, PE) device and a provider (Provider, P) device, respectively. The PE device represents an edge device. One end of the PE device is connected to user equipment, and an interface is a user network interface (User network interface, UNI); the other end of the PE device is connected to a network device, and an interface is a network-to-network interface (Network to Network Interface, NNI). Key capabilities of the PE device are aggregation and encapsulation/decapsulation. As a start point changes, a path between PE devices may be a pseudo wire PW, a tunnel, or the like. The P device represents a network device, which is a core device in a network. A major capability of the P device is a powerful switching capability. Both ends of the P device are connected to network devices, and interfaces are NNIs.

In FIG. 2A and FIG. 2B, a client adaptation unit (uAdpt) represents a user-side processing unit, and is configured to receive a user service signal and perform operations such as interface adaptation, rate adaptation, and the like. The interface adaptation may include X-E slot mapping and/or demapping. X-E slot mapping may be mapping one bit block stream into a plurality of slot bit block streams. X-E slot demapping may be demapping a plurality of slot bit block streams into one bit block stream. The interface adaptation may further include code type conversion and the like. A network adaptation unit (nAdpt) represents a network-side processing unit of an X-E technical system, and is configured to send a service signal in a device to a network side and complete corresponding functional processing, or configured to receive a network-side service signal and transfer the signal to another processing unit in a device. Alternatively, X-E slot mapping and/or demapping may be implemented by the network adaptation unit. An L1.5 switch or X-Ethernet switch, in other words, an X-Ethernet Relay (forwarding of an intermediate node), is embodied by a switching unit.

Figure 3A:
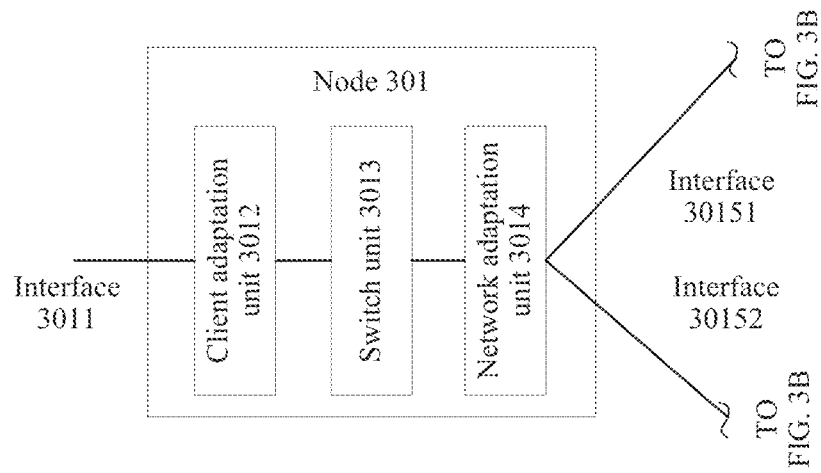
FIG. 3A, FIG. 3B, and FIG. 3C are a schematic structural diagram of an X-E slot switching network according to an embodiment of this application.
Figure 3B:
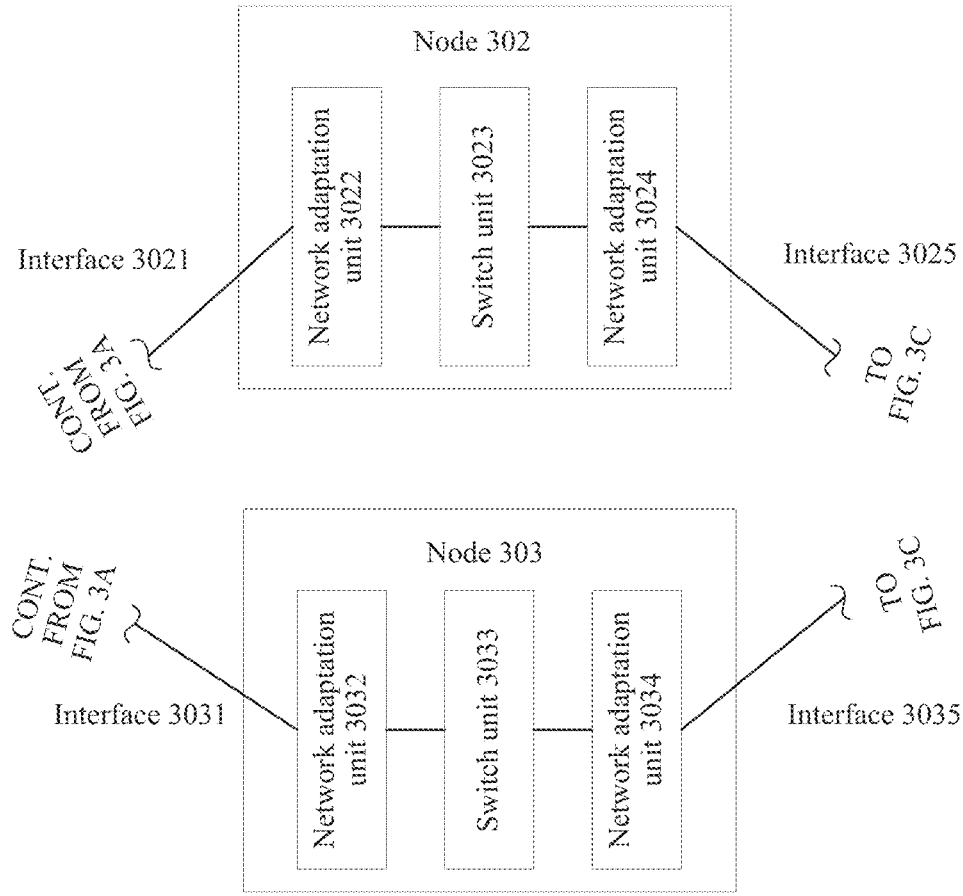
Figure 3C:
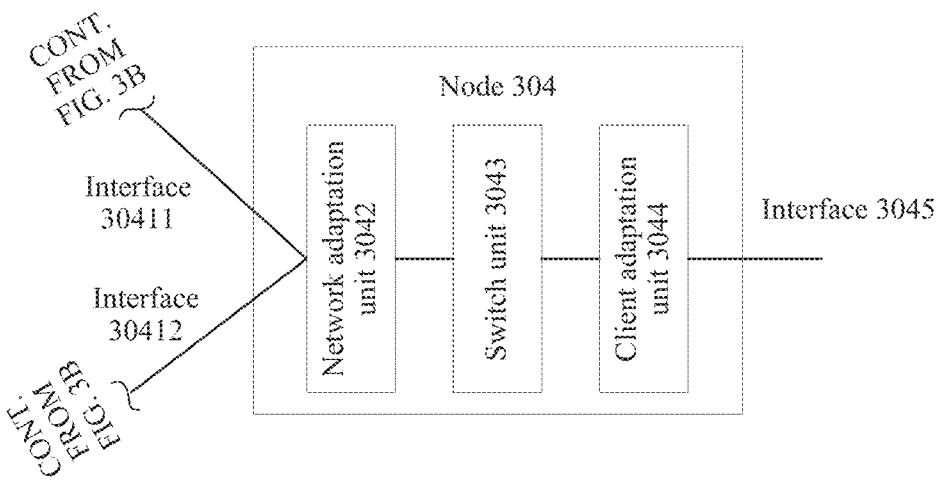
Figure 4:
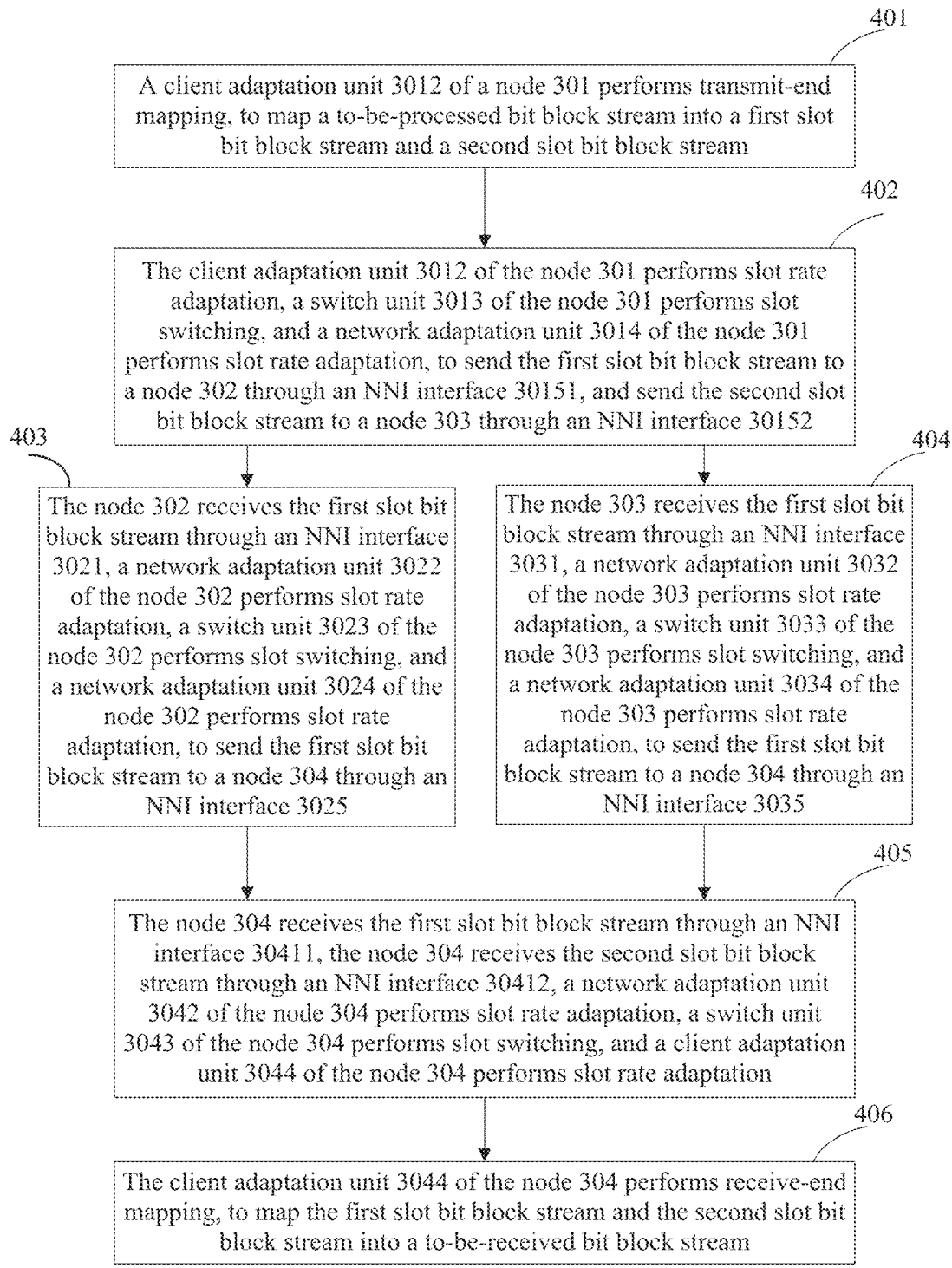
FIG. 4 is a schematic flowchart of an X-E slot switching method according to an embodiment of the present invention.

As shown in FIG. 3A, FIG. 3B, and FIG. 3C, an X-E slot switching network provided in an embodiment of the present invention includes four nodes in total: a node 301, a node 302, a node 303, and a node 304. The node 301 is a source PE device, the node 302 and the node 303 are intermediate P devices, and the node 304 is a destination PE device. The node 301 receives a 10 GE service through a UNI interface of the node 301, and needs to send the 10 GE service to the node 304 by using the node 302 and/or the node 303. The node 304 sends the received 10 GE service to a client through a UNI interface of the node 304, FIG. 4 shows an X-E slot switching method provided in an embodiment of the present invention. For detailed implementations of transmit-end mapping, slot rate adaptation, slot switching, and receive-end demapping, refer to subsequent embodiments. The method is applied in the network shown in FIG. 3A, FIG. 3B, and FIG. 3C, and specifically includes the following steps.

Step 401: A client adaptation unit 3012 of a node 301 performs transmit-end mapping, to map a to-be-processed bit block stream into a first slot bit block stream and a second slot bit block stream.

In this embodiment of the present invention, mapping the to-be-processed bit block stream into the first slot bit block stream and the second slot bit block stream is used as an example for description. In another design, the to-be-processed bit block stream may be mapped into another quantity of slot bit block streams. This is not limited in this embodiment of the present invention.

In a possible design, the transmit-end mapping may be completed by a network adaptation unit 3014 of the node 301, and after adaptation is completed, the slot bit block streams are directly sent through an NNI interface 30151, an NNI interface 30152, or another interface.

In this embodiment of the present invention, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, the first bit block is a non-idle bit block, and N is an integer greater than or equal to 1.

Step 402: The client adaptation unit 3012 of the node 301 performs slot rate adaptation, a switching unit 3013 of the node 301 performs slot switching, and a network adaptation unit 3014 of the node 301 performs slot rate adaptation, to send the first slot bit block stream to a node 302 through an NNI interface 30151, and send the second slot bit block stream to a node 303 through an NNI interface 30152.

Load balance can be achieved by sending the first slot bit block stream to the node 302 through the NNI interface 30151 and sending the second slot bit block stream to the node 303 through the NNI interface 30152. Certainly, in a possible design, both the first slot bit block stream and the second slot bit block stream may be sent to the node 302 by using different slots of the NNI interface 30151. In this case, the node 302 is required to process the first slot bit block stream and the second slot bit block stream.

Step 403: The node 302 receives the first slot bit block stream through an NNI interface 3021, a network adaptation unit 3022 of the node 302 performs slot rate adaptation, a switching unit 3023 of the node 302 performs slot switching, and a network adaptation unit 3024 of the node 302 performs slot rate adaptation, to send the first slot bit block stream to a node 304 through an NNI interface 3025.

Step 404: The node 303 receives the second slot bit block stream through an NNI interface 3031, a network adaptation unit 3032 of the node 303 performs slot rate adaptation, a switching unit 3033 of the node 303 performs slot switching, and a network adaptation unit 3034 of the node 303 performs slot rate adaptation, to send the second slot bit block stream to a node 304 through an NNI interface 3035.

Step 405: The node 304 receives the first slot bit block stream through an NNI interface 30411, the node 304 receives the second slot bit block stream through an NNI interface 30412, a network adaptation unit 3042 of the node 304 performs slot rate adaptation, a switching unit 3043 of the node 304 performs slot switching, and a client adaptation unit 3044 of the node 304 performs slot rate adaptation.

Step 406: The client adaptation unit 3044 of the node 304 performs receive-end demapping, to demap the first slot bit block stream and the second slot bit block stream into a to-be-received bit block stream.

In this embodiment of the present invention, alternatively, a packet carrier node device shown in FIG. 5A, FIG. 5B, and FIG. 5C, or FIG. 7A, FIG. 7B, and FIG. 7C may be used to process a bit block stream. Specifically, an interface card of a box-shaped device or an interface chip of a line card of a frame-shaped device implements a function of a client adaptation unit or a network adaptation unit, and a function of an X-E slot switching unit. Alternatively, a switch board may be transformed to support an X-E slot switching function, or an original switching network design remains unchanged.

Figure 5A:
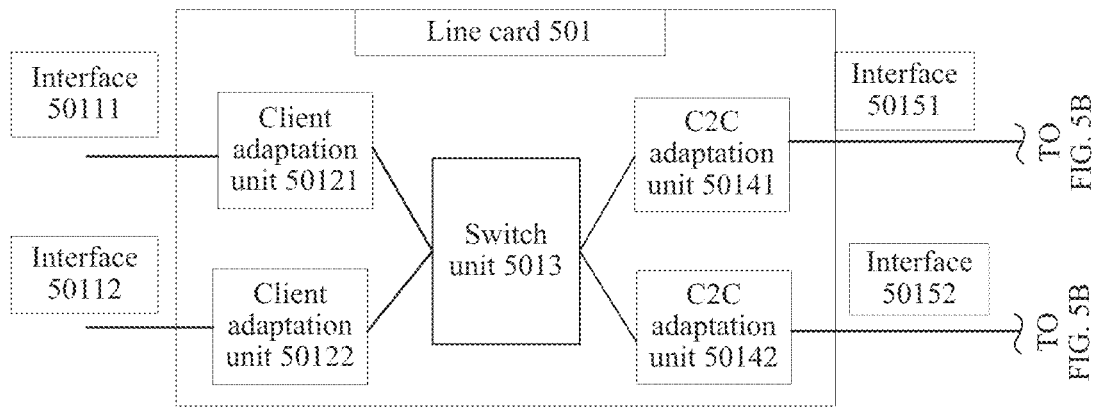
FIG. 5A, FIG. 5B, and FIG. 5C are a schematic structural diagram of a frame-shaped node device according to an embodiment of this application.
Figure 5B:
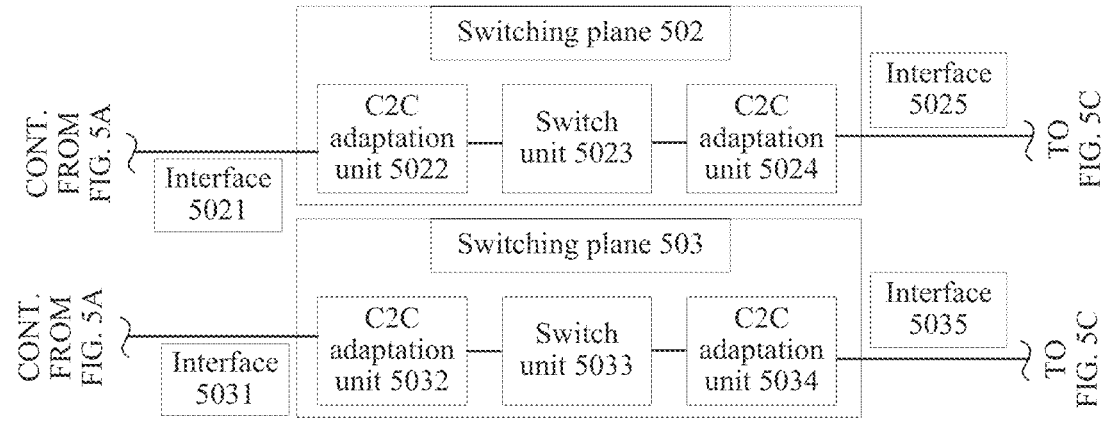
Figure 5C:
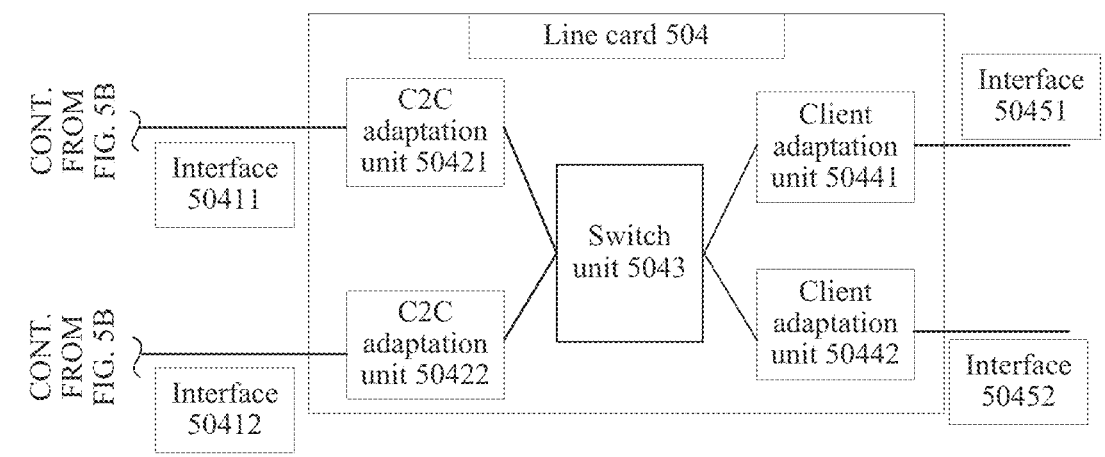

As shown in FIG. 5A, FIG. 5B, and FIG. 5C, a frame-shaped node device provided in an embodiment of the present invention includes a line card 501, a switching plane 502, a switching plane 503, and a line card 504. The switching plane 502 and the switching plane 503 may be located on different cards, or may be located on a same card. The line card 501 and the line card 504 are usually located on different cards. The frame-shaped node device may further include another card. This is not limited in this embodiment of the present invention. The line card 501, the switching plane 502, the switching plane 503, and the line card 504 are interconnected electrically or optically through a C2C interface.

Figure 6:
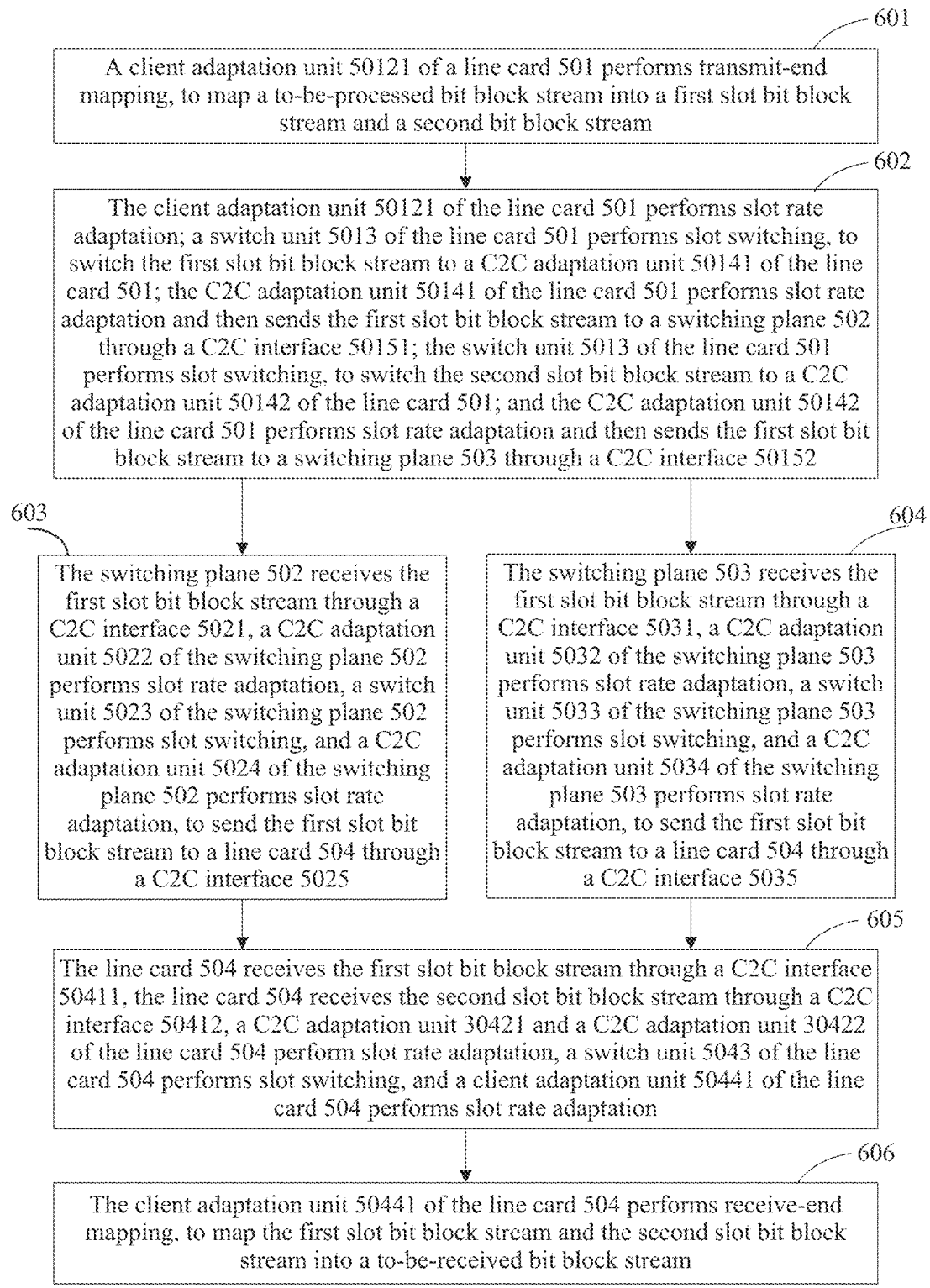
FIG. 6 is a schematic flowchart of an X-E slot switching method according to an embodiment of the present invention.

FIG. 6 shows an X-E slot switching method provided in an embodiment of the present invention. For detailed implementations of transmit-end mapping, slot rate adaptation, slot switching, and receive-end demapping, refer to subsequent embodiments. The method is applied in the network shown in FIG. 5A, FIG. 5B, and FIG. 5C, and specifically includes the following steps.

Step 601: A client adaptation unit 50121 of a line card 501 performs transmit-end mapping, to map a to-be-processed bit block stream into a first slot bit block stream and a second bit block stream.

Step 602: The client adaptation unit 50121 of the line card 501 performs slot rate adaptation; a switching unit 5013 of the line card 501 performs slot switching, to switch the first slot bit block stream to a C2C adaptation unit 50141 of the line card 501; the C2C adaptation unit 50141 of the line card 501 performs slot rate adaptation and then sends the first slot bit block stream to a switching plane 502 through a C2C interface 50151; the switching unit 5013 of the line card 501 performs slot switching, to switch the second slot bit block stream to a C2C adaptation unit 50142 of the line card 501; and the C2C adaptation unit 50142 of the line card 501 performs slot rate adaptation and then sends the second slot bit block stream to a switching plane 503 through a C2C interface 50152.

In a possible design, because the client adaptation unit 50121 has performed slot rate adaptation, the C2C adaptation unit 50141 may send the first slot bit block stream to the switching plane for slot switching, without performing slot rate adaptation.

Step 603: The switching plane 502 receives the first slot bit block stream through a C2C interface 5021, a C2C adaptation unit 5022 of the switching plane 502 performs slot rate adaptation, a switching unit 5023 of the switching plane 502 performs slot switching, and a C2C adaptation unit 5024 of the switching plane 502 performs slot rate adaptation, to send the first slot bit block stream to a line card 504 through a C2C interface 5025.

Step 604: The switching plane 503 receives the second slot bit block stream through a C2C interface 5031, a C2C adaptation unit 5032 of the switching plane 503 performs slot rate adaptation, a switching unit 5033 of the switching plane 503 performs slot switching, and a C2C adaptation unit 5034 of the switching plane 503 performs slot rate adaptation, to send the second slot bit block stream to a line card 504 through a C2C interface 5035.

Step 605: The line card 504 receives the first slot bit block stream through a C2C interface 50411, the line card 504 receives the second slot bit block stream through a C2C interface 50412, a C2C adaptation unit 50421 and a C2C adaptation unit 50422 of the line card 504 perform slot rate adaptation, a switching unit 5043 of the line card 504 performs slot switching, and a client adaptation unit 50441 of the line card 504 performs slot rate adaptation.

Step 606: The client adaptation unit 50441 of the line card 504 performs receive-end demapping, to demap the first slot bit block stream and the second slot bit block stream into a to-be-received bit block stream.

Figure 7A:
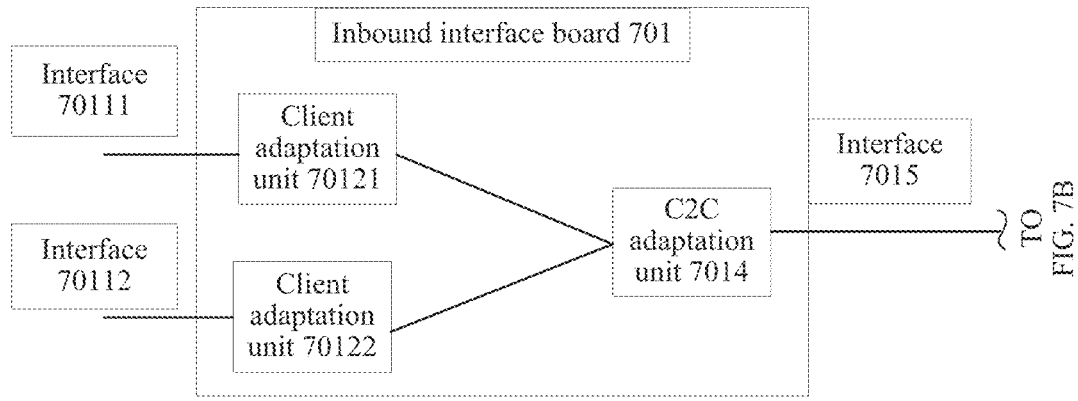
FIG. 7A, FIG. 7B, and FIG. 7C are a schematic structural diagram of a box-shaped node device according to an embodiment of this application.
Figure 7B:
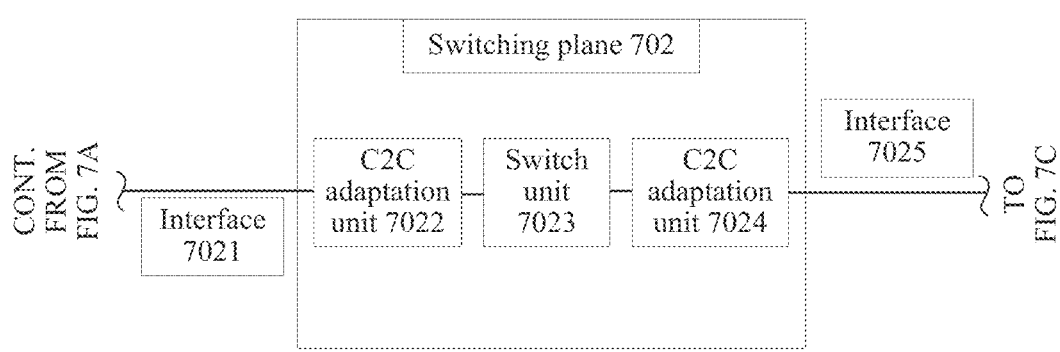
Figure 7C:
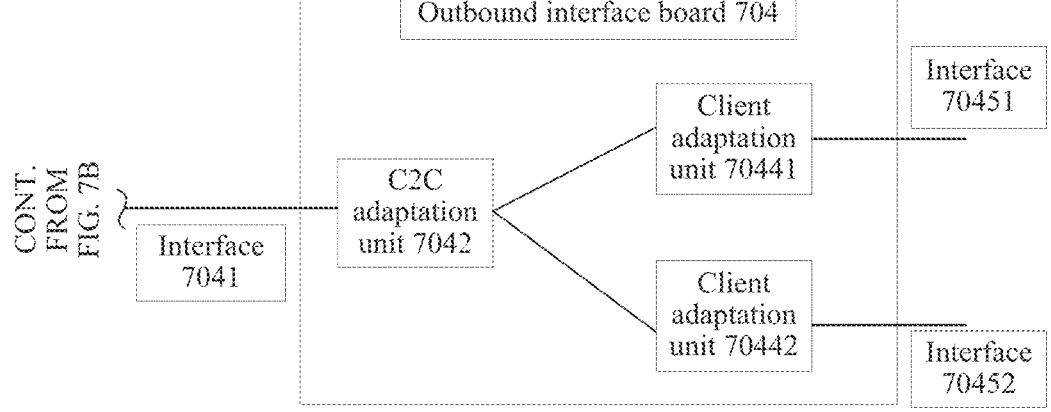

As shown in FIG. 7A, FIG. 7B, and FIG. 7C, a box-shaped node device provided in an embodiment of the present invention includes an inbound interface board 701, a switching plane 702, and an outbound interface board 704. The inbound interface board 701, the switching plane 702, and the outbound interface board 704 are usually located on different cards. The box-shaped node device usually has only one switching plane, and the interface boards do not have a switching function. This is not limited in this embodiment of the present invention. The inbound interface board 701, the switching plane 702, and the outbound interface board 704 are interconnected electrically or optically through a C2C interface.

Figure 8:
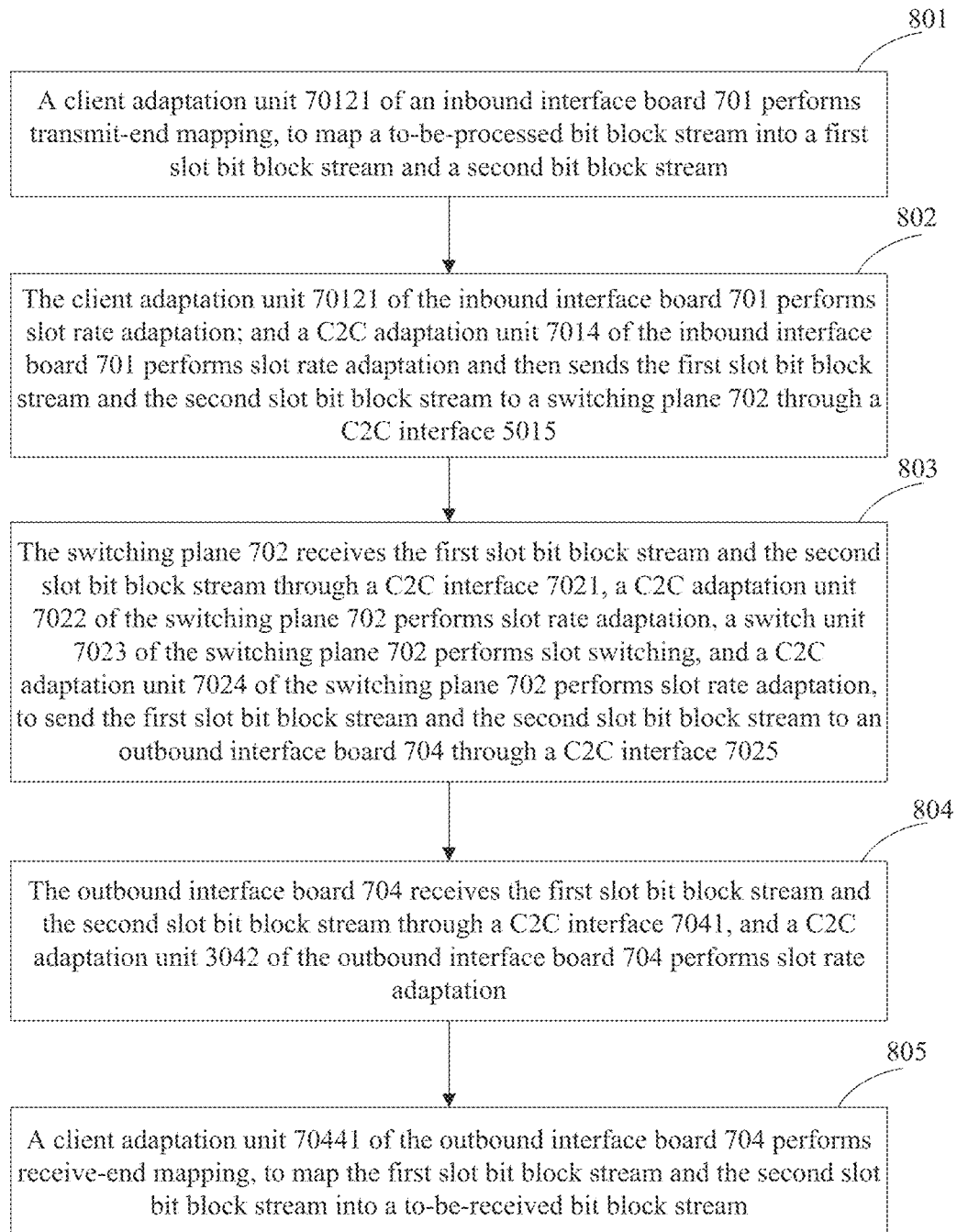
FIG. 8 is a schematic flowchart of an X-E slot switching method according to an embodiment of the present invention.

FIG. 8 shows an X-E slot switching method provided in an embodiment of the present invention. For detailed implementations of transmit-end mapping, slot rate adaptation, slot switching, and receive-end demapping, refer to subsequent embodiments. The method is applied in the network shown in FIG. 7A, FIG. 7B, and FIG. 7C, and specifically includes the following steps:

Step 801: A client adaptation unit 70121 of an inbound interface board 701 performs transmit-end mapping, to map a to-be-processed bit block stream into a first slot bit block stream and a second bit block stream.

Step 802: The client adaptation unit 70121 of the inbound interface board 701 performs slot rate adaptation; and a C2C adaptation unit 7014 of the inbound interface board 701 performs slot rate adaptation and then sends the first slot bit block stream and the second slot bit block stream to a switching plane 702 through a C2C interface 7015.

Step 803: The switching plane 702 receives the first slot bit block stream and the second slot bit block stream through a C2C interface 7021, a C2C adaptation unit 7022 of the switching plane 702 performs slot rate adaptation, a switching unit 7023 of the switching plane 702 performs slot switching, and a C2C adaptation unit 7024 of the switching plane 702 performs slot rate adaptation, to send the first slot bit block stream and the second slot bit block stream to an outbound interface board 704 through a C2C interface 7025.

Step 804: The outbound interface board 704 receives the first slot bit block stream and the second slot bit block stream through a C2C interface 7041, and a C2C adaptation unit 7042 of the outbound interface board 704 performs slot rate adaptation.

Step 805: A client adaptation unit 70441 of the outbound interface board 704 performs receive-end demapping, to demap the first slot bit block stream and the second slot bit block stream into a to-be-received bit block stream.

Figure 9A:
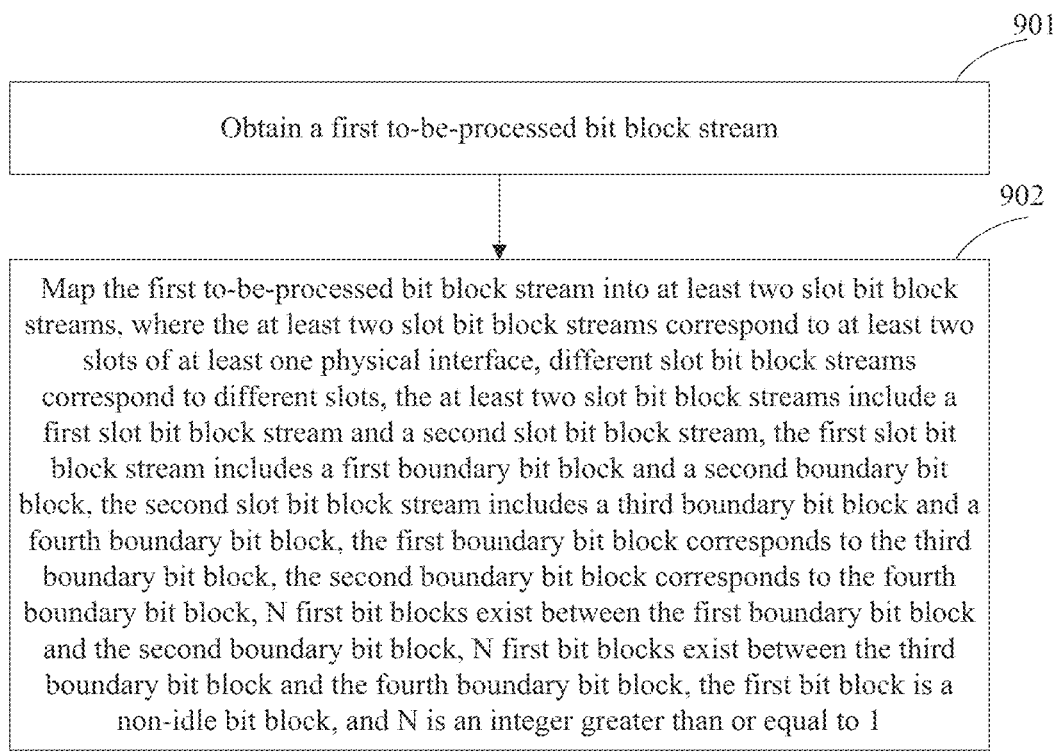
FIG. 9A is a schematic flowchart of transmit-end mapping according to an embodiment of the present invention.

FIG. 9A is a schematic diagram of transmit-end mapping according to an embodiment of the present invention, including the following steps:

Step 901: Obtain a first to-be-processed bit block stream.

Step 902: Map the first to-be-processed bit block stream into at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, the first bit block is a non-idle bit block, and N is an integer greater than or equal to 1.

In a possible design, a type of each bit block is an M1/M2 bit block, where M1 represents a quantity of payload bits of each bit block, M2 represents a total quantity of bits of each bit block, M1 and M2 are positive integers, and M2>M1. The M1/M2 bit block is an encoded bit block.

In a possible design, the first slot bit block stream is sent by using a first slot of a first physical interface, and the second slot bit block stream is sent by using a second slot of the first physical interface; or the first slot bit block stream is sent by using a first slot of a first physical interface, and the second slot bit block stream is sent by using a second slot of a second physical interface.

In a possible design, the obtaining a first to-be-processed bit block stream specifically includes: obtaining a first to-be-processed service; and performing bit block encoding on the first to-be-processed service, to obtain the first to-be-processed bit block stream. In other words, bit block encoding needs to be performed on a service stream that has not undergone bit block encoding.

In a possible design, the sending the first slot bit block stream by using a first slot of a first physical interface specifically includes: adding or deleting an idle bit block between the first boundary bit block and the second boundary bit block, to obtain a first slot bit block stream whose rate is adapted; and sending, by using the first slot of the first physical interface, the first slot bit block stream whose rate is adapted.

In a possible design, the sending the second slot bit block stream by using a second slot of the first physical interface, or sending the second slot bit block stream by using a second slot of a second physical interface specifically includes: adding or deleting an idle bit block between the third boundary bit block and the fourth boundary bit block, to obtain a second slot bit block stream whose rate is adapted; and sending, by using the second slot of the first physical interface, the second slot bit block stream whose rate is adapted, or sending, by using the second slot of the second physical interface, the second slot bit block stream whose rate is adapted.

In a possible design, the transmit-end mapping further includes: switching the first slot bit block stream in the first slot of the first physical interface to a third slot of a third physical interface.

In a possible design, the mapping the first to-be-processed bit block stream into at least two slot bit block streams specifically includes: mapping the first to-be-processed bit block stream into the at least two slot bit block streams in a round-robin scheduling manner.

A to-be-processed bit block stream is mapped into at least two slot bit block streams. The at least two slot bit block streams correspond to at least two slots of at least one physical interface, and different slot bit block streams correspond to different slots. These slot bit block streams are finally transmitted in a slot of a physical interface, and operations such as slot rate matching and slot switching may be performed before transmission. This is not limited in this embodiment of the present invention.

In a possible design, alternatively, step 902 may be: mapping the first to-be-processed bit block stream into at least two slot bit block streams, where the at least two slot bit block streams correspond to at least two slots of at least one physical interface, different slot bit block streams correspond to different slots, the at least two slot bit block streams include corresponding boundary bit blocks, and quantities of non-idle bit blocks included in slot bit block streams within two groups of corresponding boundary bit blocks are the same.

In a mapping process, in this embodiment of the present invention, the corresponding boundary bit blocks need to be inserted into the slot bit block streams, respectively. For example, the corresponding first boundary bit block and third boundary bit block are inserted into the first slot bit block stream and the second slot bit block stream, respectively, and the corresponding second boundary bit block and fourth boundary bit block are inserted into the first slot bit block stream and the second slot bit block stream, respectively. The corresponding boundary bit blocks may be same bit blocks, or may be different bit blocks. Quantities of bit blocks, quantities of non-idle bit blocks, and quantities of idle bit blocks included in slot bit block streams within two groups of corresponding boundary bit blocks are the same. In other words, each of the at least two slot bit block streams includes corresponding boundary bit blocks, and the quantities of the non-idle bit blocks included in the slot bit block streams within the two groups of corresponding boundary bit blocks are the same. In a possible design, within two groups of corresponding boundary bit blocks, quantities of non-idle bit blocks included in slot bit block streams are the same, and quantities of idle bit blocks included in the slot bit block streams are different. In other words, total quantities of bit blocks included in the slot bit block streams are also different.

In a possible design, the corresponding boundary bit blocks may be simultaneously inserted into the slot bit block streams. For example, boundary bit blocks may be simultaneously inserted into the first slot bit block stream and the second slot bit block stream. To be specific, the first boundary bit block and the third boundary bit block are simultaneously inserted, and the second boundary bit block and the fourth boundary bit block are simultaneously inserted. The corresponding boundary bit blocks are used for an alignment operation during receive-end demapping. Therefore, the corresponding boundary bit blocks may not be simultaneously inserted, provided that a receive end can perform an alignment operation.

In a possible design, one of the slot bit block streams may be determined as a start slot bit block stream, which may also be referred to as a start slot. The boundary bit block may be inserted during mapping to the start slot. For example, the to-be-processed bit block stream needs to be mapped to three slots: a slot A, a slot B, and a slot C. A mapping sequence may be ABC, CBA, or the like. If the mapping sequence is ABC, the slot A is the start slot.

A group of corresponding boundary bit blocks may be inserted periodically, for example, once every 50 ms, or may be inserted aperiodically, for example, inserted when a data stream is interrupted and no service data is transmitted currently. Quantities of non-idle bit blocks within different groups of boundary bit blocks may be different.

In a possible design, bit block mapping may be performed in a round-robin scheduling manner. To be specific, to-be-mapped bit blocks are taken from the to-be-processed bit block stream, and mapped to two slot bit block streams sequentially by using one bit block as a unit. Certainly, in another possible design, the mapping may be performed sequentially by using another quantity of bit blocks as a unit, or another mapping rule may be used. For example, first, two bit blocks are mapped to the first slot bit block stream, and three bit blocks are mapped to the second slot bit block stream; then, three bit blocks are mapped to the first slot bit block stream, and two bit blocks are mapped to the second slot bit block stream. Receive-end demapping can be performed, provided that a receive end knows a non-idle bit block mapping rule used in the transmit-end mapping.

For the to-be-mapped bit block taken from the to-be-processed bit block stream, if the to-be-mapped bit block is empty (no service data is transmitted currently) or the to-be-mapped bit block is an idle bit block, the idle bit block may be mapped to the slot bit block stream. If the to-be-mapped bit block is not empty or an idle bit block, but a previously mapped bit block is an idle bit block, the to-be-mapped bit block is mapped when a quantity of consecutively mapped idle bit blocks is an integer multiple of a quantity of the slot bit block streams; or an idle bit block continues to be mapped when a quantity of consecutively mapped idle bit blocks is not an integer multiple of the slot bit block streams. In this way, quantities of idle bit blocks in two slot bit block streams are the same, and quantities of non-idle bit blocks in the two slot bit block streams are also the same.

In a possible design, the bit block in the slot bit block stream is an Ethernet M1/M2 bit block. For an Ethernet service stream, a to-be-processed bit block stream may be directly obtained. An idle bit block in the to-be-processed bit block stream may or may not be deleted before the transmit-end mapping, and the idle bit block in the to-be-processed bit block stream is usually an Ethernet interpacket gap (interpacket gap, IPG). For a non-Ethernet service stream, M1/M2 bit block encoding usually needs to be performed, to obtain a to-be-processed bit block stream. For example, 64/66 encoding may be performed on a common public radio interface (common public radio interface, CPRI) service stream.

Figure 9B:
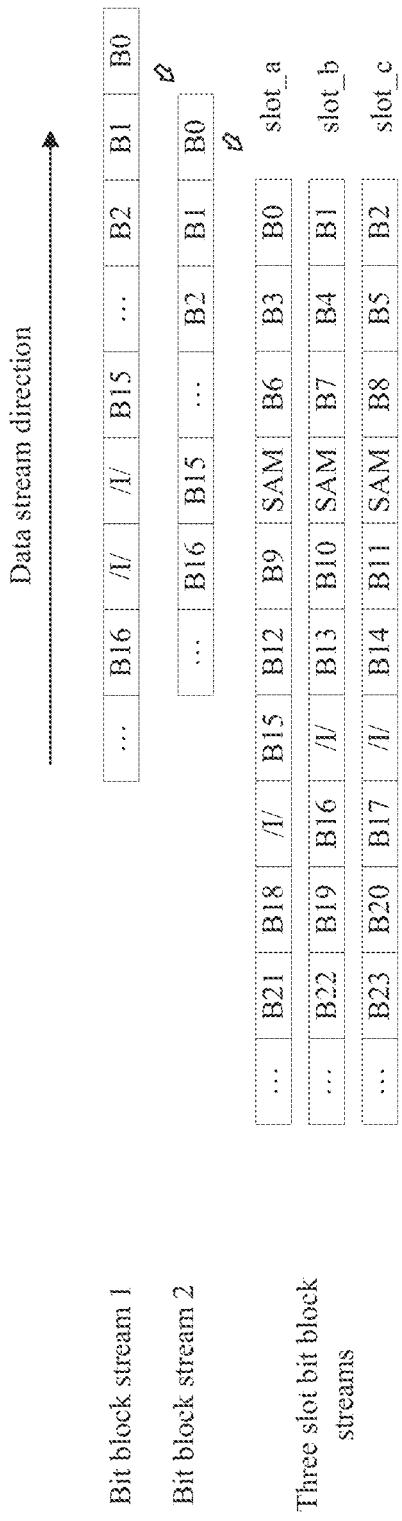
FIG. 9B is a schematic diagram of transmit-end mapping according to an embodiment of the present invention.

FIG. 9B is a schematic diagram of transmit-end mapping according to an embodiment of the present invention.

In this embodiment of the present invention, a 15G Ethernet service is mapped to three 5G slots. Slot mapping is performed by using one bit block as a unit. The three 5G slots are slot_a, slot_b, and slot_c, respectively. An inserted boundary bit block is a slot alignment marker (slot aligned mark, SAM).

Step 1: Receive a service bit block stream, delete all idle bit blocks in the service bit block stream, then buffer the service bit block stream whose idle bit blocks are deleted, and wait for mapping. As shown in FIG. 9B, a bit block stream 1 is processed into a bit block stream 2, and idle bit blocks between B15 and B16 are deleted.

Step 2: Determine whether a start slot is being mapped currently; if the start slot is being mapped currently, determine whether SAMs need to be inserted; and insert the SAMs into slot_a, slot_b, and slot_c, respectively if the SAMs need to be inserted, or go to step 3 if the SAMs do not need to be inserted.

Step 3: Detect whether a to-be-mapped bit block exists in a buffer; and go to step 4 if the to-be-mapped bit block exists in the buffer, or go to step 5 if no to-be-mapped bit block exists in the buffer.

Step 4: Read one bit block from the buffer, put the bit block into a slot corresponding to a mapping pointer, change the mapping pointer to point to a next slot, and then jump to step 1 for a next cycle.

Step 5: Insert three idle bit blocks; map the three idle bit blocks to the three slots sequentially, where after a round of mapping, the mapping pointer points again to a slot to which the mapping pointer points before insertion of the idle bit blocks; and then jump to step 1 for a next cycle. As shown in FIG. 9B, the bit block stream 2 is processed into three slot bit block streams, and if no to-be-mapped bit block exists in the buffer after B15, the idle bit blocks are mapped to the three slots sequentially.

Figure 9C:
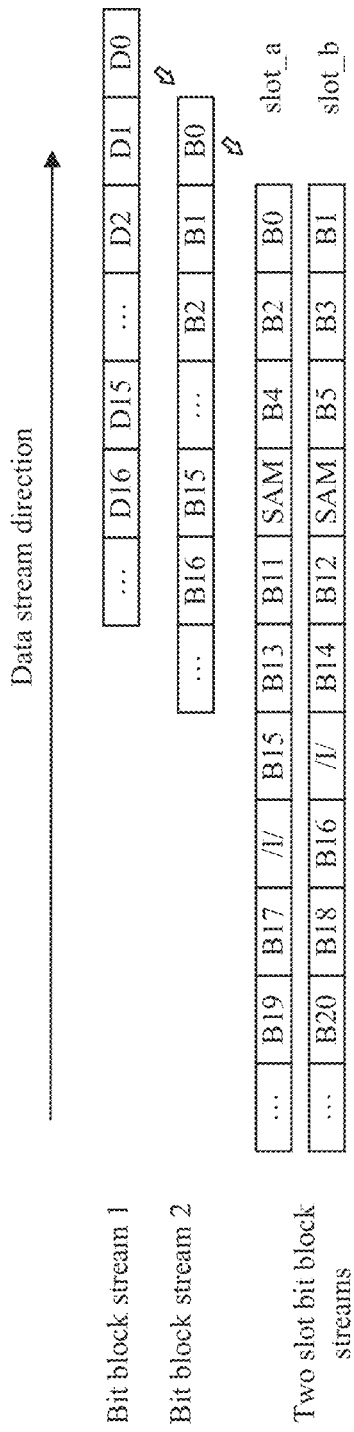
FIG. 9C is another schematic diagram of transmit-end mapping according to an embodiment of the present invention.

FIG. 9C is a schematic diagram of transmit-end mapping according to an embodiment of the present invention.

In this embodiment of the present invention, one 10G CPRI service is mapped to two 5G slots. Slot mapping is performed by using one bit block as a unit. The two 5G slots are slot_a and slot_b. An inserted boundary bit block is a SAM.

Step 1: Receive and encode an input CPRI service data stream, then buffer an encoded bit block stream, and wait for mapping. As shown in FIG. 9C, a service stream 1 is processed into a bit block stream 2.

Step 2: Determine whether a start slot is being mapped currently; if the start slot is being mapped currently, determine whether SAMs need to be inserted; and insert the SAMs into slot_a and slot_b, respectively if the SAMs need to be inserted, or go to step 3 if the SAMs do not need to be inserted.

Step 3: Detect whether a to-be-mapped bit block exists in a buffer; and go to step 4 if the to-be-mapped bit block exists in the buffer, or go to step 5 if no to-be-mapped bit block exists in the buffer.

Step 4: Read one bit block from the buffer, put the bit block into a slot corresponding to a mapping pointer, change the mapping pointer to point to a next slot, and then jump to step 1 for a next cycle.

Step 5: Insert two idle bit blocks; map the two idle bit blocks to the two slots sequentially, where after a round of mapping, the mapping pointer points again to a slot to which the mapping pointer points before insertion of the idle bit blocks; and then jump to step 1 for a next cycle. As shown in FIG. 9C, the bit block stream 2 is processed into two slot bit block streams, and if no to-be-mapped bit block exists in the buffer after B15, the idle bit blocks are mapped to the two slots sequentially.

A difference between the embodiment shown in FIG. 9C and the embodiment shown in FIG. 9B lies in that an accessed service is a non-Ethernet service. Encoding needs to be performed before slot mapping can be performed. In addition, neither an 1PG nor an idle bit block exists in the non-Ethernet service, and therefore deletion of an idle bit block is unnecessary.

Figure 9D:
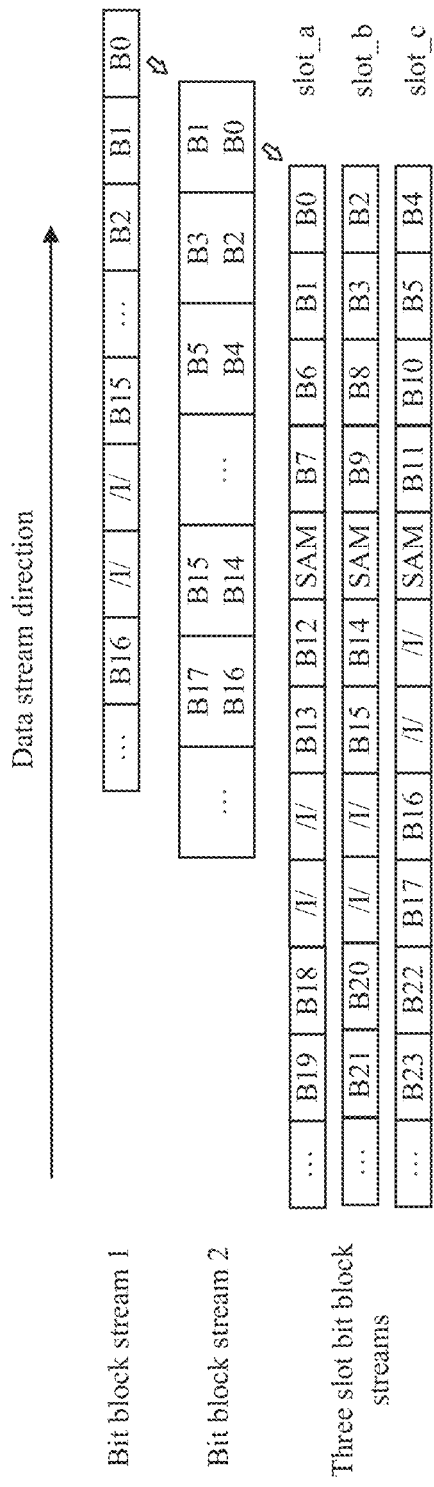
FIG. 9D is still another schematic diagram of transmit-end mapping according to an embodiment of the present invention.

FIG. 9D is a schematic diagram of transmit-end mapping according to an embodiment of the present invention.

In this embodiment of the present invention, a 15G Ethernet service is mapped to three 5G slots. Slot mapping is performed by using two bit blocks as a unit. The three 5G slots are slot_a, slot_b, and slot_c, respectively. An inserted boundary bit block is a SAM.

Step 1: Receive an input service bit block stream, delete all idle bit blocks in the service stream, then buffer the service stream whose idle bit blocks are deleted, and wait for mapping. As shown in FIG. 9D, a bit block stream 1 is processed into a bit block stream 2, and the bit block stream 2 in FIG. 9D may be the same as the bit block stream 2 in FIG. 9B. Every two bit blocks are put together merely for ease of understanding.

Step 2: Determine whether a start slot is being mapped currently; if the start slot is being mapped currently, determine whether SAMs need to be inserted; and insert the SAMs into slot_a, slot_b, and slot_c, respectively if the SAMs need to be inserted, or go to step 3 if the SAMs do not need to be inserted.

Step 3: Detect whether bit blocks in a buffer are sufficient to form one mapping unit, for example, the mapping unit herein includes two bit blocks; and go to step 4 if the bit blocks in the buffer are sufficient to form the one mapping unit, or go to step 5 if the hit blocks in the buffer are not sufficient to form the one mapping unit.

Step 4: Read two bit blocks from the buffer, put the bit blocks into a slot corresponding to a mapping pointer, change the mapping pointer to point to a next slot, and then jump to step 1 for a next cycle.

Step 5: insert six idle bit blocks; map the six idle bit blocks to the three slots sequentially, where two idle bit blocks are mapped to each slot, and after a round of mapping, the mapping pointer points again to a slot to which the mapping pointer points before insertion of the idle bit blocks; and then jump to step 1 for a next cycle. As shown in FIG. 9D, the bit block stream 2 is processed into three slot bit block streams, and if no to-be-mapped bit block exists in the buffer after B15, the idle bit blocks are mapped to the three slots sequentially.

A difference between the embodiment shown in FIG. 9D and the embodiment shown in FIG. 9B lies in that slot mapping is performed by using two bit blocks as a unit.

Figure 9E:
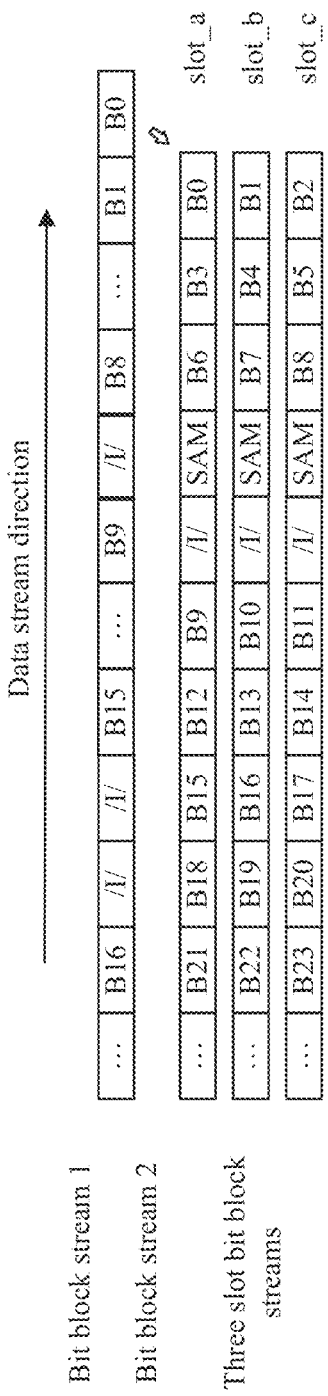
FIG. 9E is still another schematic diagram of transmit-end mapping according to an embodiment of the present invention.

FIG. 9E is a schematic diagram of transmit-end mapping according to an embodiment of the present invention.

In this embodiment of the present invention, a 15G Ethernet service is mapped to three 5G slots. Slot mapping is performed by using one bit block as a unit. The three 5G slots are slot_a, slot_b, and slot_c, respectively. An inserted boundary bit block is a slot alignment marker (slot aligned mark). In this embodiment of the present invention, IPG idle bit block deletion is not performed when an Ethernet service is input. Idle adjustment is performed during mapping. An objective of idle adjustment is to ensure that a quantity of consecutive idle bit blocks is an integer multiple of a quantity of slots each time. In addition, a quantity of deleted idle bit blocks and a quantity of inserted idle bit blocks should be balanced.

Step 1: Receive an input service bit block stream, skip deleting an IPG idle bit block in the service stream, directly buffer the service stream, and wait for mapping. A bit block stream 1 shown in FIG. 9E is used as an example.

Step 2: Determine whether a start slot is being mapped currently; if the start slot is being mapped currently, determine whether slot align marks need to be inserted; and insert the slot align marks into slot_a, slot_b, and slot_c, respectively if the slot align marks need to be inserted, or go to step 3 if the slot align marks do not need to be inserted.

Step 3: Take a to-be-mapped bit block from a buffer; and go to step 6 if the to-be-mapped bit block is a non-idle bit block and a previously mapped bit block is also a non-idle bit block, or go to step 5 if the to-be-mapped bit block is a non-idle bit block and a previously mapped bit block is an idle bit block, or go to step 4 if the to-be-mapped bit block is an idle bit block.

Step 4: Determine whether a current idle bit block needs to be deleted; and if a quantity of inserted valid idle bit blocks is greater than 0, delete the idle bit block, decrease the quantity of inserted valid idle bit blocks by 1, and jump to step 1 for a next cycle; or if a quantity of inserted valid idle bit blocks is equal to 0, increase a quantity of consecutively mapped idle bit blocks by 1, map the to-be-mapped idle bit block to a slot to which a mapping pointer points, change the mapping pointer to point to a next slot, and then jump to step 1 for a next cycle.

Step 5: Determine whether the quantity of the consecutively mapped idle bit blocks is an integer multiple of 3; and if the quantity of the consecutively mapped idle bit blocks is an integer multiple of 3, map the to-be-mapped bit block to a slot to which the mapping pointer points, change the mapping pointer to point to a next slot, and then jump to step 1 for a next cycle; or if the quantity of the consecutively mapped idle bit blocks is not an integer multiple of 3, insert one or more idle bit blocks and then map the to-be-mapped bit block to a corresponding slot to ensure that the quantity of the consecutive idle bit blocks is an integer multiple of 3, update the quantity of the inserted valid idle bit blocks based on a quantity of the inserted idle bit blocks, and jump to step 1 for a next cycle. For example, as shown in FIG. 9E, because there is only one idle bit block after a bit block B8, two idle bit blocks need to be inserted, and then B9 is mapped.

Step 6: Map the to-be-mapped bit block to a slot to which the mapping pointer points, change the mapping pointer to point to a next slot, and then jump to step 1 for a next cycle.

In the transmit-end mapping embodiments shown in FIG. 9B to FIG. 9E, the provided idle bit block insertion manners are merely several easy implementations. In a possible design, after boundary bit block insertion, idle bit blocks in each slot bit block stream are counted. Before next boundary bit block insertion, it only needs to be ensured that quantities of idle bit blocks in slot bit block streams are the same. In other words, quantities of non-idle bit blocks in the slot bit block streams are also the same. During receive-end demapping, the slot bit block streams may be aligned by using boundary bit blocks after all the idle bit blocks are deleted. Further, demapping is performed according to a demapping rule corresponding to a transmit-end non-idle bit block mapping rule, to restore a to-be-received bit block stream.

Separate slot rate matching may be performed on a single slot bit block stream that includes boundary bit blocks. FIG.

10A is a schematic diagram of a slot rate matching method according to an embodiment of the present invention.

Step 1001: Obtain a first slot bit block stream, where the first slot bit block stream includes a first boundary bit block and a second boundary bit block, N first bit blocks exist between the first boundary bit block and the second boundary bit block, the first bit block is a non-idle bit block, and N is an integer greater than or equal to 1.

Step 1002: Add or delete an idle bit block between the first boundary bit block and the second boundary bit block, to obtain a first slot bit block stream whose rate is adapted.

Step 1003: Send, by using a second slot of a second physical interface, the first slot bit block stream whose rate is adapted.

In a possible design, a type of each bit block is an M1/M2 bit block, where M1 represents a quantity of payload bits of each bit block, M2 represents a total quantity of bits of each bit block, M1 and M2 are positive integers, and M2>M1.

Figure 10A:
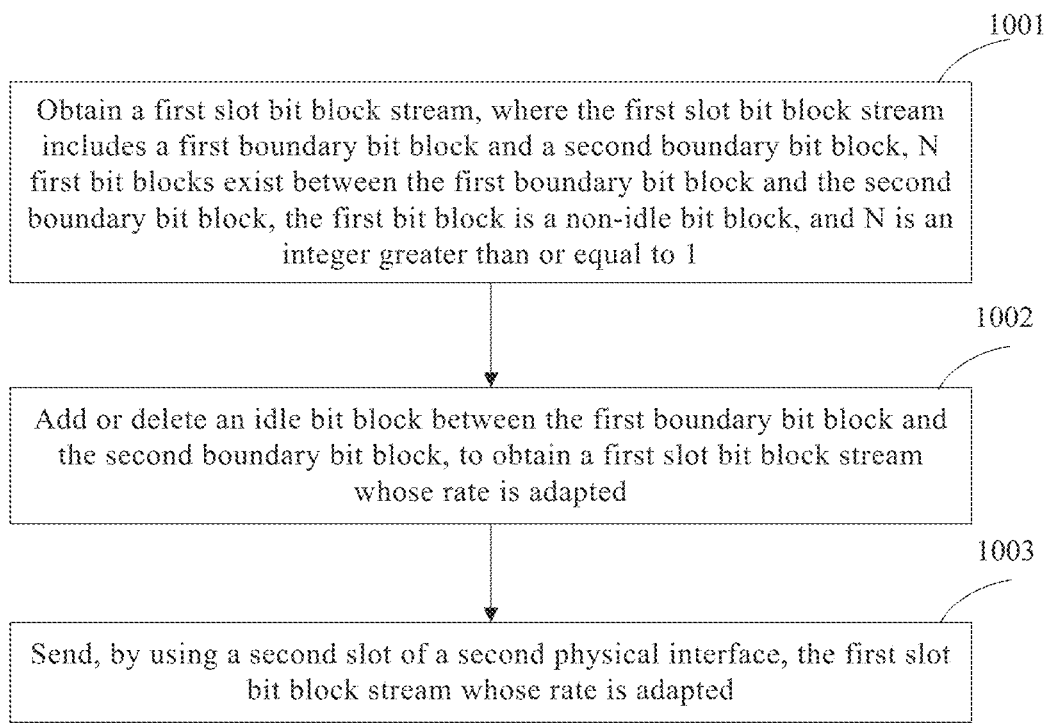
FIG. 10A is a schematic flowchart of a slot rate matching method according to an embodiment of the present invention.
Figure 10B:
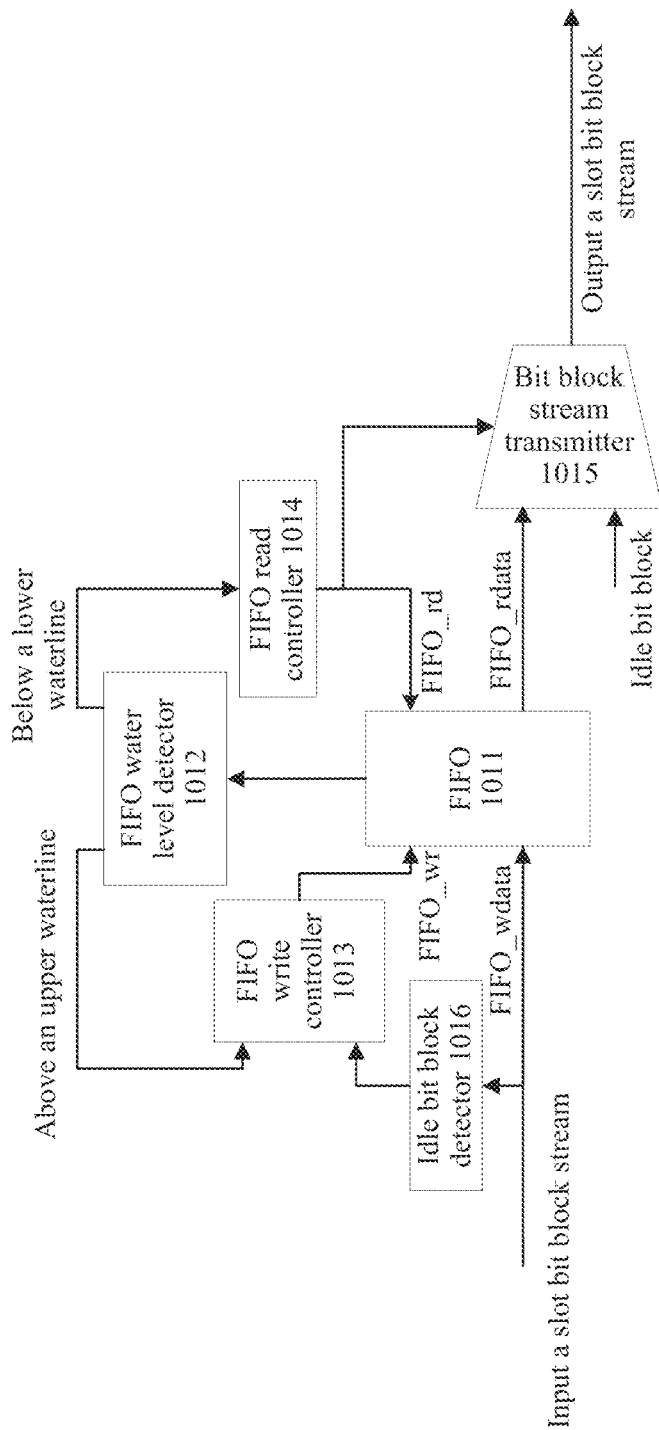
FIG. 10B is a structural diagram of a slot rate matching circuit according to an embodiment of the present invention.

FIG. 10B is a diagram of a slot rate matching circuit according to an embodiment of the present invention, including a first in first out buffer (FIFO) 1011, a FIFO water level detector 1012, a FIFO write controller 1013, a FIFO read controller 1014, a bit block stream transmitter 1015, and an idle bit block detector 1016.

An input slot bit block stream is split into two, one to the idle detector 1016, and the other to the FIFO 1011. If the FIFO water level detector 1012 detects that a water level of the FIFO is above an upper waterline, the FIFO water level detector 1012 notifies the FIFO write controller 1013, and the FIFO write controller 1013 blocks writing an idle bit block based on detection of the idle bit block detector 1016, that is, deletes the idle bit block. If the FIFO water level detector 1012 detects that the water level in the FIFO is below a lower waterline, the FIFO water level detector 1012 notifies the FIFO read controller 1014, the FIFO read controller 1014 blocks reading a FIFO bit block, and the bit block stream transmitter 1015 outputs an idle bit block.

Slot rate adaptation is usually performed between an inbound interface and a switching network, or between a switching network and an outbound interface, or between two functional modules whose rates are different. Each slot may be processed separately. As shown in FIG. 10B, there is an asynchronous buffer, that is, the FIFO. Whether an idle bit block needs to be deleted or an idle bit block needs to be inserted is determined based on the upper waterline and the lower waterline of the buffer.

Figure 11:
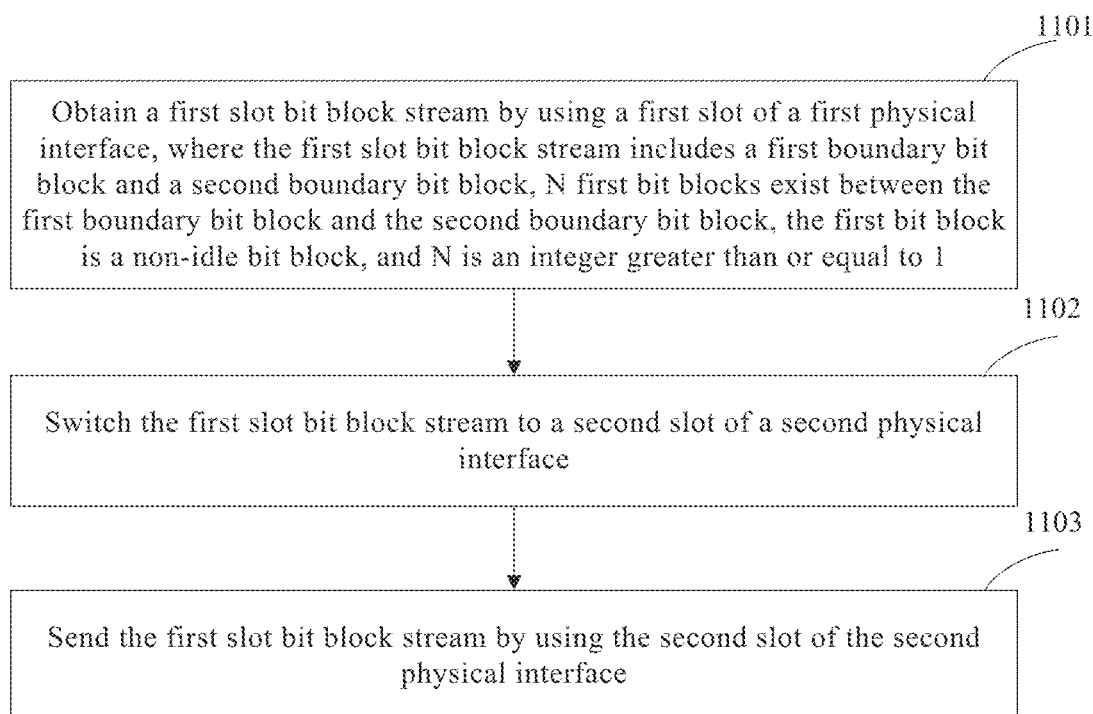
FIG. 11 is a schematic flowchart of a slot switching method according to an embodiment of the present invention.

Separate slot switching may be performed on a single slot bit block stream that includes boundary bit blocks. FIG. 11 is a schematic diagram of a slot switching method according to an embodiment of the present invention.

Step 1101: Obtain a first slot bit block stream by using a first slot of a first physical interface, where the first slot bit block stream includes a first boundary bit block and a second boundary bit block, N first bit blocks exist between the first boundary bit block and the second boundary bit block, the first bit block is a non-idle bit block, and N is an integer greater than or equal to 1.

Step 1102: Switch the first slot bit block stream to a second slot of a second physical interface.

Step 1103: Send the first slot bit block stream by using the second slot of the second physical interface.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the sending the first slot bit block stream by using the second slot of the second physical interface specifically includes: adding or deleting an idle bit block between the first boundary bit block and the second boundary bit block, to obtain a first slot bit block stream whose rate is adapted; and sending, by using the second slot of the second physical interface, the first slot bit block stream whose rate is adapted.

In a possible design, the switching the first slot bit block stream to a second slot of a second physical interface specifically includes: switching the first slot bit block stream to the second slot of the second physical interface based on a correspondence between the first slot of the first physical interface and the second slot of the second physical interface.

An objective of slot switching is to switch a slot bit block stream from a slot of an inbound physical interface to a slot of an outbound physical interface by using a slot as a unit. A switching relationship may be determined based on a preconfigured correspondence, or may be temporarily configured according to a slot allocation table.

A specific physical implementation of slot switching may be based on a switching manner such as circuit switching, SDH/OTM TDM switching, or packet/cell switching.

For the circuit switching, each received or mapped slot bit block stream is used as an input, each sent slot bit block stream is used as an output, and the input is in a one-to-one correspondence with the output. Non-blocking switching is implemented by using an N×N full space-division cross circuit, where N is a quantity of input or output lines.

For the SDH/OTN TDM switching, a switching path may be shared in a space-division and time-division multiplexing manner, and each bit block in a slot bit block stream is used as a slot switching unit and corresponds to one slot of an SDH/OTN TDM switching network, so that a bit block in a slot bit block stream can be switched from one interface to another interface.

For the packet/cell switching, a slot bit block stream may be segmented according to a reception sequence, and encapsulated and carried by using cells, and the cells are numbered and sent to a cell switching network for switching. After switching is completed, encapsulated information is removed from the cells, and the cells are arranged according to a numbering sequence, to restore an original slot bit block stream.

Figure 12:
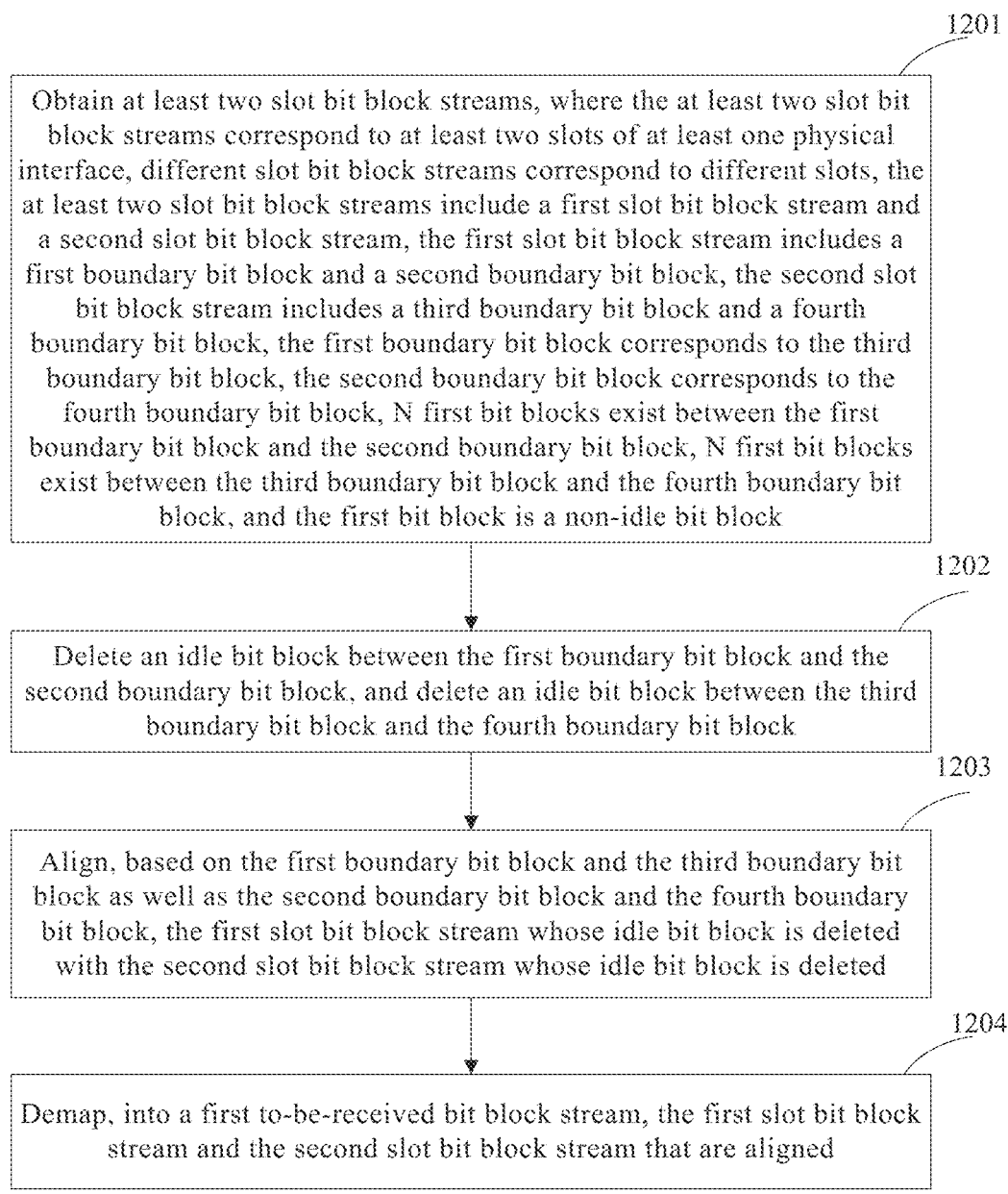
FIG. 12 is a schematic flowchart of receive-end demapping according to an embodiment of the present invention.

FIG. 12 is a schematic diagram of receive-end demapping according to an embodiment of the present invention, including the following steps:

Step 1201: Obtain at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, and the first bit block is a non-idle bit block.

Step 1202: Delete an idle bit block between the first boundary bit block and the second boundary bit block, and delete an idle bit block between the third boundary bit block and the fourth boundary bit block.

Step 1203: Align, based on the first boundary bit block and the third boundary bit block as well as the second boundary bit block and the fourth boundary bit block, the first slot bit block stream whose idle bit block is deleted with the second slot bit block stream whose idle bit block is deleted.

Step 1204: Demap, into a first to-be-received bit block stream, the first slot bit block stream and the second slot bit block stream that are aligned.

A quantity of non-idle bit blocks between the first boundary bit block and the second boundary bit block that are received by a receive-end device is equal to a quantity of non-idle bit blocks between the third boundary bit block and the fourth boundary bit block that are received by the receive-end device. The receive-end device may align the slot bit block streams by using the boundary bit blocks after all idle bit blocks are deleted, thereby restoring a to-be-received bit block stream. Demapping after alignment can be implemented only by using a demapping rule corresponding to a transmit-end non-idle bit block mapping rule, and details are not described herein.

In a possible design, alternatively, step 1201 may be: obtaining at least two slot bit block streams, where the at least two slot bit block streams correspond to at least two slots of at least one physical interface, different slot bit block streams correspond to different slots, the at least two slot bit block streams include corresponding boundary bit blocks, and quantities of non-idle bit blocks included in slot bit block streams within two groups of corresponding boundary bit blocks are the same.

In a possible design, alternatively, step 1202 may be: deleting idle bit blocks included in each slot bit block stream.

In a possible design, alternatively, step 1203 may be: aligning, based on corresponding boundary bit blocks, the slot bit block streams whose idle bit blocks are deleted.

In a possible design, alternatively, step 1204 may be: demapping, into the first to-be-received bit block stream, the slot bit block streams that are aligned.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the receive-end demapping further includes: performing bit block decoding on the first to-be-received bit block stream, to obtain a first to-be-received service.

In a possible design, the receive-end demapping further includes: performing IPG restoration on the first to-be-received bit block stream, to obtain a first to-be-received service.

In a possible design, the obtaining at least two slot bit block streams specifically includes: obtaining the first slot bit block stream by using a first slot of a first physical interface, and obtaining the second slot bit block stream by using a second slot of the first physical interface; or obtaining the first slot bit block stream by using a first slot of a first physical interface, and obtaining the second slot bit block stream by using a second slot of a second physical interface.

According to the receive-end demapping, all idle bit blocks in each slot bit block stream may be deleted, and then a plurality of slot bit block streams may be aligned based on boundary bit blocks, so that a to-be-received bit block stream can be restored. The restored to-be-received bit block stream may be post-processed and then output through a user interface. For an Ethernet service, IPG restoration may be performed, and for a non-Ethernet service, M1/M2 decoding may be performed, to output an original service stream.

Figure 13:
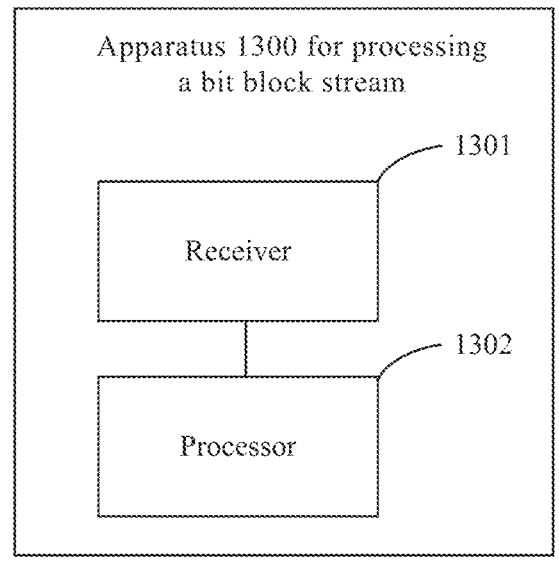
FIG. 13 is a schematic structural diagram of an apparatus for processing a bit block stream according to an embodiment of this application.

Based on the foregoing embodiments and a same concept, FIG. 13 is a schematic diagram of an apparatus 1300 for processing a bit block stream according to an embodiment of this application. The apparatus 1300 for processing a bit block stream may be implemented in the client adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in the network adaptation unit or C2C adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in another network device or network module. The apparatus 1300 for processing a bit block stream includes:

a receiver 1301, configured to obtain a first to-be-processed bit block stream; and a processor 1302, configured to map the first to-be-processed bit block stream into at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, the first bit block is a non-idle bit block, and N is an integer greater than or equal to 1.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the apparatus 1300 further includes: a transmitter, configured to send the first slot bit block stream by using a first slot of a first physical interface, and send the second slot bit block stream by using a second slot of the first physical interface; or a transmitter, configured to send the first slot bit block stream by using a first slot of a first physical interface, and send the second slot bit block stream by using a second slot of a second physical interface.

In a possible design, the receiver is specifically configured to obtain a first to-be-processed service, and perform bit block encoding on the first to-be-processed service, to obtain the first to-be-processed bit block stream.

In a possible design, the transmitter is specifically configured to: add or delete an idle bit block between the first boundary bit block and the second boundary bit block, to obtain a first slot bit block stream whose rate is adapted; and send, by using the first slot of the first physical interface, the first slot bit block stream whose rate is adapted.

In a possible design, the transmitter is specifically configured to: add or delete an idle bit block between the third boundary bit block and the fourth boundary bit block, to obtain a second slot bit block stream whose rate is adapted; and send, by using the second slot of the first physical interface, the second slot bit block stream whose rate is adapted, or send, by using the second slot of the second physical interface, the second slot bit block stream whose rate is adapted.

In a possible design, the apparatus 1300 further includes: a switch, configured to switch the first slot bit block stream in the first slot of the first physical interface to a third slot of a third physical interface.

In a possible design, the processor is specifically configured to map the first to-be-processed bit block stream into the at least two slot bit block streams in a round-robin scheduling manner.

Figure 14:
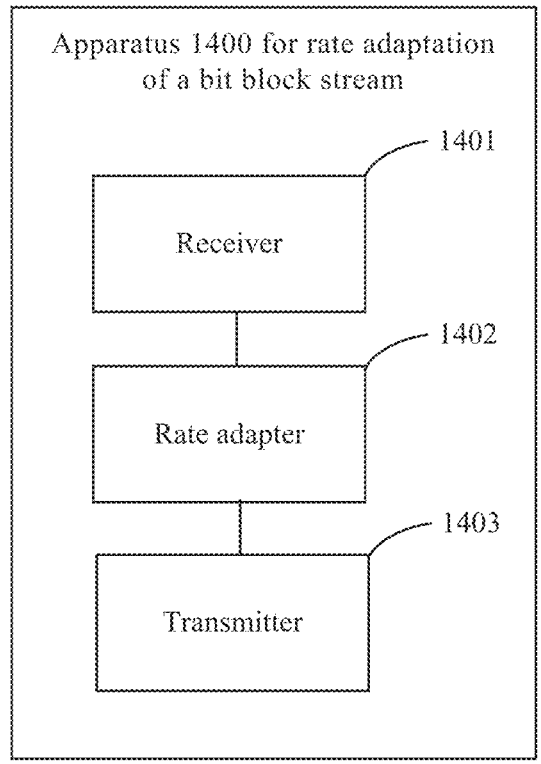
FIG. 14 is a schematic structural diagram of an apparatus for rate adaptation of a bit block stream according to an embodiment of this application.

Based on the foregoing embodiments and a same concept, FIG. 14 is a schematic diagram of an apparatus 1400 for rate adaptation of a bit block stream according to an embodiment of this application. The apparatus 1400 for rate adaptation of a bit block stream may be implemented in the client adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in the network adaptation unit or C2C adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in another network device or network module. The apparatus 1400 for rate adaptation of a bit block stream includes:

a receiver 1401, configured to obtain a first slot bit block stream, where the first slot bit block stream includes a first boundary bit block and a second boundary bit block, N first bit blocks exist between the first boundary bit block and the second boundary bit block, the first bit block is a non-idle bit block, and N is an integer greater than or equal to 1;

a rate adapter 1402, configured to add or delete an idle bit block between the first boundary bit block and the second boundary bit block, to obtain a first slot bit block stream whose rate is adapted; and a transmitter 1403, configured to send, by using a second slot of a second physical interface, the first slot bit block stream whose rate is adapted.

In a possible design, a type of each bit block is an M1/M2 bit block, where M1 represents a quantity of payload bits of each bit block, M2 represents a total quantity of bits of each bit block, M1 and M2 are positive integers, and M2>M1.

Figure 15:
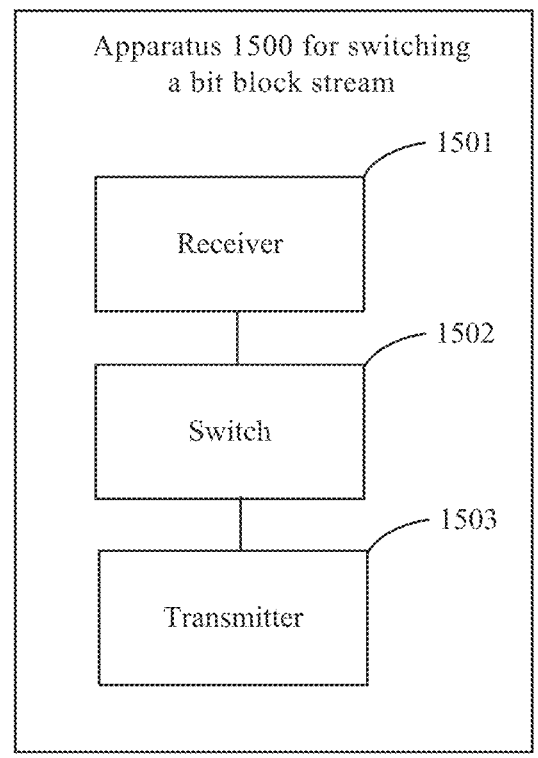
FIG. 15 is a schematic structural diagram of an apparatus for switching a bit block stream according to an embodiment of this application.

Based on the foregoing embodiments and a same concept, FIG. 15 is a schematic diagram of an apparatus 1500 for switching a bit block stream according to an embodiment of this application. The apparatus 1500 for switching a bit block stream may be implemented in the switching unit in FIG. 3A, FIG. 3B, and FIG. 3C, FIG. 5A, FIG. 5B, and FIG. 5C, or FIG. 7A, FIG. 7B, and FIG. 7C, or may be implemented in another network device or network module. The apparatus 1500 for switching a bit block stream includes:

a receiver 1501, configured to obtain a first slot bit block stream by using a first slot of a first physical interface, where the first slot bit block stream includes a first boundary bit block and a second boundary bit block, N first bit blocks exist between the first boundary bit block and the second boundary bit block, the first bit block is a non-idle bit block, and N is an integer greater than or equal to 1;

a switch 1502, configured to switch the first slot bit block stream to a second slot of a second physical interface; and a transmitter 1503, configured to send the first slot bit block stream by using the second slot of the second physical interface.

In a possible design, a type of each bit block is an M1/M2 bit block, where M1 represents a quantity of payload bits of each bit block. M2 represents a total quantity of bits of each bit block, M1 and M2 are positive integers, and M2>M1.

In a possible design, the transmitter is specifically configured to: add or delete an idle bit block between the first boundary bit block and the second boundary bit block, to obtain a first slot bit block stream whose rate is adapted; and send, by using the second slot of the second physical interface, the first slot bit block stream whose rate is adapted.

In a possible design, the switch is specifically configured to switch the first slot bit block stream to the second slot of the second physical interface based on a correspondence between the first slot of the first physical interface and the second slot of the second physical interface.

Figure 16:
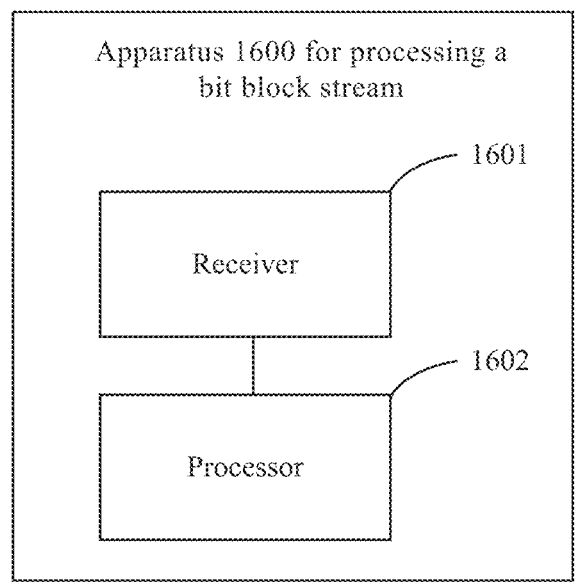
FIG. 16 is a schematic structural diagram of an apparatus for processing a bit block stream according to an embodiment of this application.

Based on the foregoing embodiments and a same concept, FIG. 16 is a schematic diagram of an apparatus 1600 for processing a bit block stream according to an embodiment of this application. The apparatus 1600 for processing a bit block stream may be implemented in the client adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in the network adaptation unit or C2C adaptation unit in FIG. 3A, FIG. 3B, and FIG. 3C, FIG. 5A, FIG. 5B, and FIG. 5C, or FIG. 7A, FIG. 7B, and FIG. 7C, or may be implemented in another network device or network module. The apparatus 1600 for processing a bit block stream includes:

a receiver, configured to obtain at least two slot bit block streams, where the at least two slot bit block streams correspond to at least two slots of at least one physical interface, different slot bit block streams correspond to different slots, the at least two slot bit block streams include a first slot bit block stream and a second slot bit block stream, the first slot bit block stream includes a first boundary bit block and a second boundary bit block, the second slot bit block stream includes a third boundary bit block and a fourth boundary bit block, the first boundary bit block corresponds to the third boundary bit block, the second boundary bit block corresponds to the fourth boundary bit block, N first bit blocks exist between the first boundary bit block and the second boundary bit block, N first bit blocks exist between the third boundary bit block and the fourth boundary bit block, and the first bit block is a non-idle bit block; and a processor, configured to delete an idle bit block between the first boundary bit block and the second boundary bit block, and delete an idle bit block between the third boundary bit block and the fourth boundary bit block; align, based on the first boundary bit block and the third boundary bit block as well as the second boundary bit block and the fourth boundary bit block, the first slot bit block stream whose idle bit block is deleted with the second slot bit block stream whose idle bit block is deleted; and demap, into a first to-be-received bit block stream, the first slot bit block stream and the second slot bit block stream that are aligned.

In a possible design, a type of each bit block is an M1/M2 bit block, where M1 represents a quantity of payload bits of each bit block, M2 represents a total quantity of bits of each bit block, M1 and M2 are positive integers, and M2>M1.

In a possible design, the apparatus 1600 further includes: a decoder, configured to perform bit block decoding on the first to-be-received bit block stream, to obtain a first to-be-received service.

In a possible design, the apparatus 1600 further includes: an IPG restorer, configured to perform IPG restoration on the first to-be-received bit block stream, to obtain a first to-be-received service.

In a possible design, the receiver is specifically configured to: obtain the first slot bit block stream by using a first slot of a first physical interface, and obtain the second slot bit block stream by using a second slot of the first physical interface or obtain the first slot bit block stream by using a first slot of a first physical interface, and obtain the second slot bit block stream by using a second slot of a second physical interface.

In an implementation process, steps in the foregoing methods may be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the field, such as a random access memory, a flash memory, a read-only memory, a programmable read-only memory or an electrically-erasable programmable memory, or a register. The storage medium is located in the memory, and the processor reads information in the memory and completes the steps in the foregoing methods in combination with hardware of the processor. To avoid repetition, details are not described herein again.

It should also be understood that the first, the second, the third, the fourth, and various numerals in this specification are used for differentiation and only used for ease of description, instead of limiting the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects unless otherwise specified.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, with reference to descriptions in the embodiments disclosed in this specification, various illustrative logical blocks (illustrative logical block) and steps (step) may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the system, apparatus, and unit that are described above, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, some or all of the embodiments may be implemented in a form of a computer program product. The computer program product includes one or more computer instructions. When the computer instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, a computer instruction may be transmitted from a website, computer, server, or data center to another website, computer, server, or data center in a wired manner (for example, by using a coaxial cable, an optical fiber, or a digital subscriber line (DSL)) or a wireless manner (for example, by using infrared, radio, or microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a bit block stream, comprising:
    obtaining a first to-be-processed bit block stream;
    mapping the first to-be-processed bit block stream into at least two slot bit block streams, wherein the at least two slot bit block streams correspond to at least two slots of at least one physical interface, wherein different slot bit block streams correspond to different slots, wherein the at least two slot bit block streams comprise a first slot bit block stream and a second slot bit block stream, wherein the first slot bit block stream comprises a first boundary bit block and a second boundary bit block, wherein the second slot bit block stream comprises a third boundary bit block and a fourth boundary bit block, wherein the first boundary bit block corresponds to the third boundary bit block for an alignment operation during demapping, wherein the second boundary bit block corresponds to the fourth boundary bit block for the alignment operation during the demapping, wherein N first bit blocks exist between the first boundary bit block and the second boundary bit block, wherein N first bit blocks exist between the third boundary bit block and the fourth boundary bit block, wherein each of the N first bit blocks is a non-idle bit block, and wherein N is an integer greater than or equal to 1;

adding or deleting an idle bit block between the first boundary bit block and the second boundary bit block to obtain a first slot bit block stream whose rate is adapted; and sending, by using a first slot of a first physical interface, the first slot bit block stream whose rate is adapted.

2. The method according to claim 1, wherein a type of each bit block is an M1/M2 bit block, wherein M1 represents a quantity of payload bits of each bit block, wherein M2 represents a total quantity of bits of each bit block, wherein M1 and M2 are positive integers, and wherein M2 is larger than M1.

3. The method according to claim 1, further comprising:
sending the second slot bit block stream by using a second slot of the first physical interface; or
sending the second slot bit block stream by using a second slot of a second physical interface.

4. The method according to claim 3, wherein the sending the second slot bit block stream by using a second slot of the first physical interface, or sending the second slot bit block stream by using a second slot of a second physical interface comprises:
adding or deleting an idle bit block between the third boundary bit block and the fourth boundary bit block to obtain a second slot bit block stream whose rate is adapted; and
sending, by using the second slot of the first physical interface, the second slot bit block stream whose rate is adapted; or
sending, by using the second slot of the second physical interface, the second slot bit block stream whose rate is adapted.

5. The method according to claim 3, further comprising:
switching the first slot bit block stream in the first slot of the first physical interface to a third slot of a third physical interface.

6. The method according to claim 1, wherein the obtaining a first to-be-processed bit block stream comprises:
obtaining a first to-be-processed service; and
performing bit block encoding on the first to-be-processed service to obtain the first to-be-processed bit block stream.

7. The method according to claim 1, wherein the mapping the first to-be-processed bit block stream into at least two slot bit block streams comprises:
mapping the first to-be-processed bit block stream into the at least two slot bit block streams in a round-robin scheduling manner.

8. An apparatus for processing a bit block stream, comprising:
a receiver, configured to obtain a first to-be-processed bit block stream;
at least one processor;

a memory storing instructions executable by the at least one processor, wherein the instructions, when executed by the at least one processor, instruct the at least one processor to:
map the first to-be-processed bit block stream into at least two slot bit block streams, wherein the at least two slot bit block streams correspond to at least two slots of at least one physical interface, wherein different slot bit block streams correspond to different slots, wherein the at least two slot bit block streams comprise a first slot bit block stream and a second slot bit block stream, wherein the first slot bit block stream comprises a first boundary bit block and a second boundary bit block, wherein the second slot bit block stream comprises a third boundary bit block and a fourth boundary bit block, wherein the first boundary bit block corresponds to the third boundary bit block for an alignment operation during demapping, wherein the second boundary bit block corresponds to the fourth boundary bit block for the alignment operation during the demapping, wherein N first bit blocks exist between the first boundary bit block and the second boundary bit block, wherein N first bit blocks exist between the third boundary bit block and the fourth boundary bit block, wherein each of the N first bit blocks is a non-idle bit block, and wherein N is an integer greater than or equal to 1; and
add or delete an idle bit block between the first boundary bit block and the second boundary bit block to obtain a first slot bit block stream whose rate is adapted; and
a transmitter, configured to:
send, by using a first slot of a first physical interface, the first slot bit block stream whose rate is adapted.

9. The apparatus according to claim 8, wherein a type of each bit block is an M1/M2 bit block, wherein M1 represents a quantity of payload bits of each bit block, wherein M2 represents a total quantity of bits of each bit block, wherein M1 and M2 are positive integers, and wherein M2 is larger than M1.

10. The apparatus according to claim 8, wherein the transmitter is further configured to:
send the second slot bit block stream by using a second slot of the first physical interface; or
send the second slot bit block stream by using a second slot of a second physical interface.

11. The apparatus according to claim 10, wherein the transmitter is configured to:
add or delete an idle bit block between the third boundary bit block and the fourth boundary bit block to obtain a second slot bit block stream whose rate is adapted; and
send, by using the second slot of the first physical interface, the second slot bit block stream whose rate is adapted; or
send, by using the second slot of the second physical interface, the second slot bit block stream whose rate is adapted.

12. The apparatus according to claim 10, further comprising:
a switch, configured to switch the first slot bit block stream in the first slot of the first physical interface to a third slot of a third physical interface.

13. The apparatus according to claim 8, wherein the receiver is configured to:
obtain a first to-be-processed service; and perform bit block encoding on the first to-be-processed service to obtain the first to-be-processed bit block stream.

\* \* \* \* \*